(12) United States Patent
Byrne

(10) Patent No.: US 8,790,126 B2
(45) Date of Patent: Jul. 29, 2014

(54) DC RECEPTACLE

(76) Inventor: Norman R. Byrne, Ada, MI (US)

(*) Notice: Subject to any disclaimer, the term of this patent is extended or adjusted under 35 U.S.C. 154(b) by 0 days.

(21) Appl. No.: 12/977,819

(22) Filed: Dec. 23, 2010

(65) Prior Publication Data

US 2011/0088942 A1   Apr. 21, 2011

Related U.S. Application Data

(63) Continuation of application No. 12/622,126, filed on Nov. 19, 2009, now abandoned, which is a continuation of application No. 11/761,660, filed on Jun. 12, 2007, now abandoned.

(60) Provisional application No. 60/812,854, filed on Jun. 12, 2006.

(51) Int. Cl.
| | | |
|---|---|---|
| H01R 4/60 | (2006.01) | |
| H01R 25/16 | (2006.01) | |
| H01R 31/02 | (2006.01) | |

(52) U.S. Cl.
CPC .............. *H01R 25/162* (2013.01); *H01R 31/02* (2013.01); *H01R 25/16* (2013.01)
USPC .......................................................... 439/215

(58) Field of Classification Search
USPC .......................................... 439/215, 216, 532
See application file for complete search history.

(56) References Cited

U.S. PATENT DOCUMENTS

| | | | |
|---|---|---|---|
| 4,367,370 A | 1/1983 | Wilson et al. | |
| 4,579,403 A | 4/1986 | Byrne | |
| 4,775,328 A | 10/1988 | McCarthy | |
| 4,781,609 A | 11/1988 | Wilson et al. | |
| 4,990,110 A | 2/1991 | Byrne | |
| 4,993,576 A | 2/1991 | Byrne | |
| 5,096,434 A | 3/1992 | Byrne | |
| 5,203,712 A * | 4/1993 | Kilpatrick et al. | 439/215 |
| 5,252,086 A | 10/1993 | Russell et al. | |
| 5,259,787 A | 11/1993 | Byrne | |
| 6,315,589 B1 | 11/2001 | Inniss et al. | |
| 6,405,139 B1 | 6/2002 | Kicinski et al. | |
| 6,445,571 B1 | 9/2002 | Inniss et al. | |
| 6,559,556 B1 | 5/2003 | Wills | |
| 6,857,896 B2 * | 2/2005 | Rupert et al. | 439/489 |
| 7,182,633 B2 | 2/2007 | Byrne | |
| 7,264,499 B2 * | 9/2007 | Kondas | 439/456 |
| 7,455,535 B2 * | 11/2008 | Insalaco et al. | 439/121 |
| 7,520,762 B2 * | 4/2009 | Lehman et al. | 439/115 |
| 7,559,795 B2 | 7/2009 | Byrne | |
| 8,317,547 B2 | 11/2012 | Riner et al. | |
| 8,350,406 B2 | 1/2013 | Byrne et al. | |
| 2009/0221169 A1 | 9/2009 | Byrne | |
| 2010/0184315 A1 | 7/2010 | Byrne | |
| 2011/0104922 A1 | 5/2011 | Byrne | |
| 2012/0127637 A1 | 5/2012 | Byrne et al. | |
| 2012/0231645 A1 | 9/2012 | Byrne | |
| 2012/0231652 A1 | 9/2012 | Byrne et al. | |
| 2013/0095681 A1 | 4/2013 | Byrne | |
| 2013/0119772 A1 | 5/2013 | Byrne et al. | |

* cited by examiner

*Primary Examiner* — Neil Abrams
*Assistant Examiner* — Travis Chambers
(74) *Attorney, Agent, or Firm* — Gardner, Linn, Burkhart & Flory, LLP

(57) ABSTRACT

A DC receptacle block includes a DC receptacle for interconnecting to a DC plug. The DC receptacle is electrically engageable with a junction block having buses or wires carrying DC power.

20 Claims, 21 Drawing Sheets

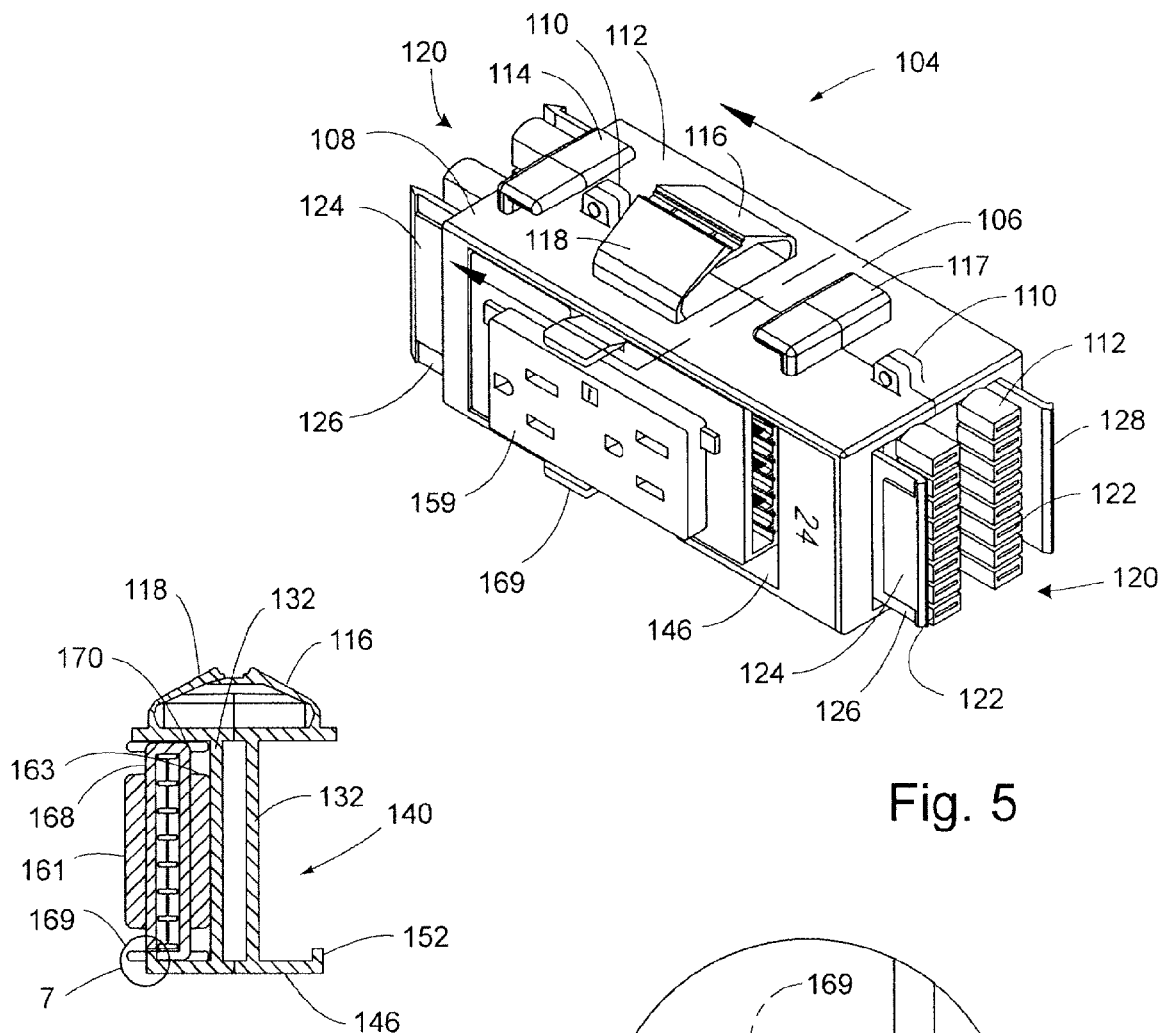
Fig. 5
Fig. 6
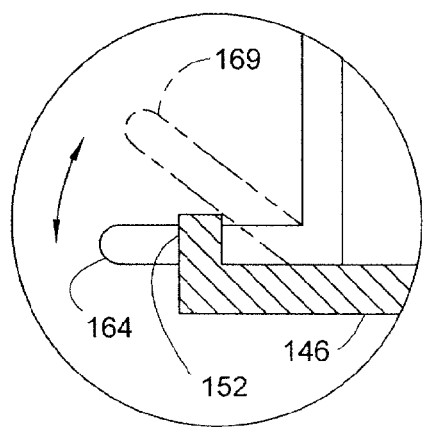
Fig. 7

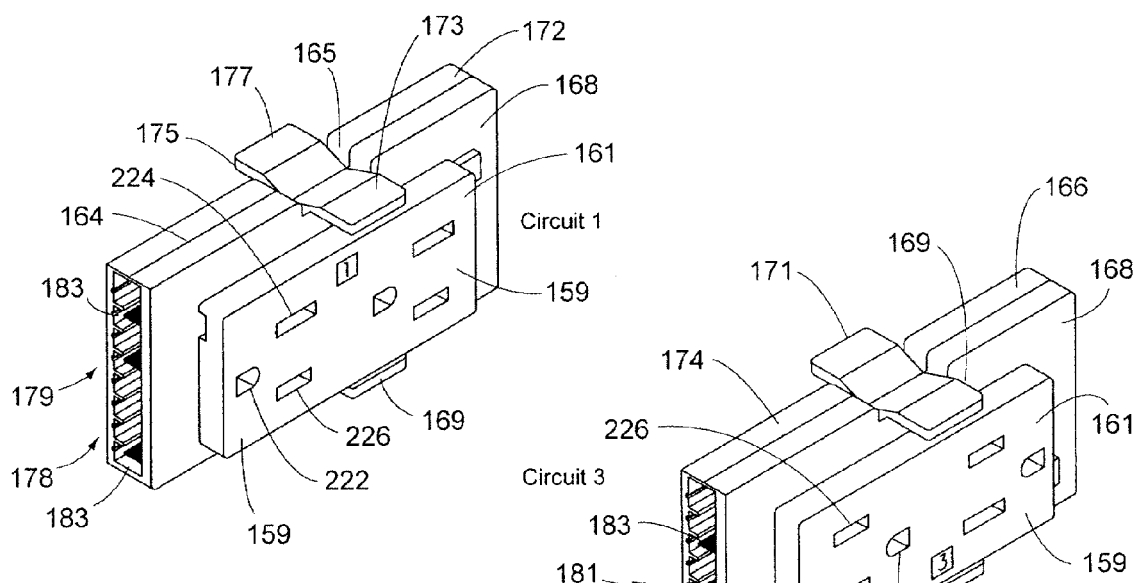

DC RECEPTACLE

CROSS-REFERENCE TO RELATED APPLICATIONS

This Application is a continuation of U.S. patent application Ser. No. 12/622,126, filed Nov. 19, 2009, now abandoned, which is a continuation of U.S. patent application Ser. No. 11/761,660, filed Jun. 12, 2007, now abandoned, which claims priority of U.S. provisional application Ser. No. 60/812,854, filed Jun. 12, 2006.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to electrical power systems and, more particularly, to arrangements providing for DC integration of power within raceway assemblies having electrical junction blocks and receptacle blocks.

2. Background Art

The use of computers, associated computer peripherals (e.g. printers and the like), copiers, facsimile machines, sophisticated telecommunications equipment and other electronic devices is continuing to rapidly increase in commercial, industrial and office environments. As a result, the importance of efficiently supplying power throughout these environments is also increasing. For example, the use of modular office systems, with multiple workstations and interior walls, has led to electrical systems relatively more sophisticated than conventional designs comprising receptacle mounts and electrical receptacles in stationary walls, with the receptacles energized from incoming power supplies extending through wall interiors. Such conventional and stationary wall-mounted systems were often located a substantial distance from the electrical devices to be energized and numerous electrical cords connecting the devices to the outlets would cause unsightly and sometimes dangerous entanglements. Thereafter, movable pluggable units having a number of receptacles on a common power source cord to be plugged into the conventional utility outlets were used. Again, however, such units resulted in unsightly and entangled arrays of electrical device cords.

With the growth of the use of electrical power in office systems, it became known to employ removable wall panels or the like, which defined modular workplace areas. Further, raceway areas were developed for use in the panels or other structures, for accommodating electrical wiring and electrical junction blocks near the locations to be energized. Typically, junction blocks were mounted within the raceway areas by attaching them with various types of structural arrangements. Outlet receptacle blocks having a number of receptacles were first formed as an integral part of the junction blocks. Thereafter, it became known to employ receptacles which were assembled as devices separate from the junction blocks, but were mechanically and electrically connectable to the junction blocks. During the past two decades, a substantial amount of research and development have been directed to raceways, junction blocks and receptacles, means for interconnection of the junction blocks and receptacles, and mounting of the junction blocks within the raceways.

Most of the known electrical power systems utilizing modular configurations and raceway assemblies are specifically directed to AC power. Also, it is known to utilize conventional RJ-11, RJ-45 or similar types of input/output configurations with electrical lift-up systems or other systems utilized with office furniture.

It would be advantageous and an object of the invention, to provide for DC integration of electrical AC power raceway assemblies, without requiring a substantial number of differing types of components. That is, it is a further object of the invention to provide for DC power, using various receptacle configurations, and also using known raceway assemblies with the concept of junction blocks within which receptacle blocks may be engaged.

SUMMARY OF THE INVENTION

In accordance with the invention, a raceway assembly is provided having a plurality of junction blocks electrically interconnected together. The junction blocks have buses or wires carrying at least one DC power circuit. The raceway assembly further comprises a DC receptacle block having a DC receptacle electrically engageable with the DC buses or wires.

BRIEF DESCRIPTION OF THE DRAWINGS

The invention will now be described with respect to the drawings, in which:

FIG. 5 is a perspective view of the electrical junction block and the outlet receptacle block of FIG. 1, with the outlet receptacle block in an electrically engaged position with the junction block, in a circuit 1 orientation;

FIG. 6 is a sectional view of the electrical junction block and outlet receptacle block illustrated in FIG. 5, taken along section lines 6-6 of FIG. 5;

FIG. 7 is an enlarged view of a portion of the electrical junction block illustrated in FIG. 6, taken within circle 7 and illustrating the relative positioning of the electrical outlet receptacle block and the electrical junction block when the outlet receptacle block is electrically engaged with the junction block in a circuit 1 orientation;

FIG. 16 is a perspective view of the electrical outlet receptacle block illustrated in FIG. 3, showing a circuit 1 orientation;

FIG. 17 is a perspective view similar to FIG. 16, but showing the outlet receptacle block "flipped" end to end so as to show a circuit 2 orientation;

FIG. 18 is a perspective view of the outlet receptacle block shown in FIG. 17, with the receptacle block providing for a circuit 3 orientation by "flipping" the receptacle block from top to bottom relative to the configuration of the outlet receptacle block in FIG. 17;

FIG. 19 is a perspective view of the outlet receptacle block shown in FIG. 18, with FIG. 19 illustrating a circuit 4 orientation provided by flipping the outlet receptacle block end to end relative to the configuration in FIG. 18;

DETAILED DESCRIPTION

Figure 1:
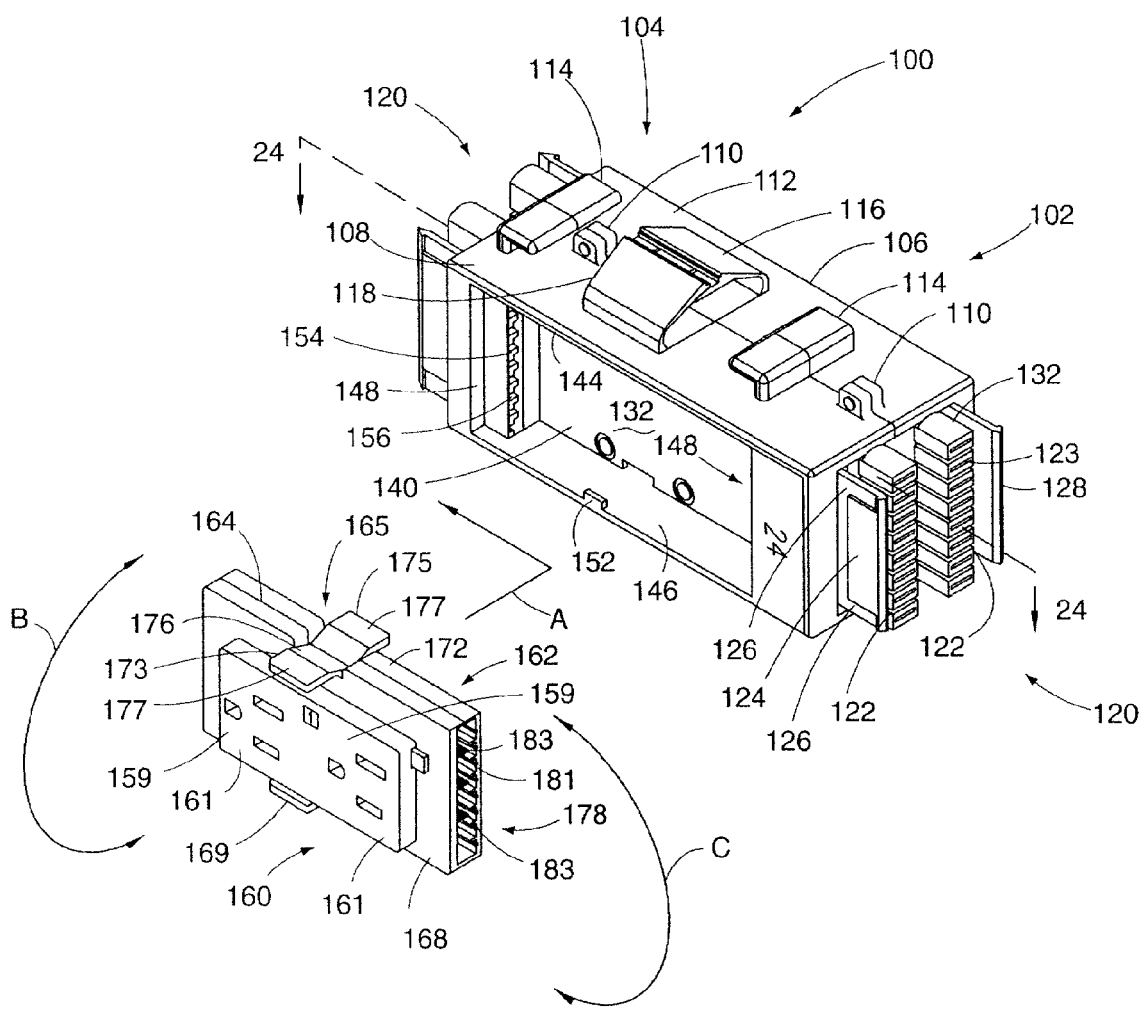
FIG. 1 is a perspective and partially exploded view illustrating a prior art electrical junction block having a plurality of terminals representing a plurality of different electrical circuits, and an electrical outlet receptacle block which can be selectively and electrically interconnected to different ones of the electrical circuits.

The principles of the invention are disclosed, by way of example, in several embodiments of DC receptacle blocks as described in subsequent paragraphs herein and illustrated in FIGS. 26-39. For purposes of general background regarding raceway assemblies, junction blocks and electrical receptacles, the first part of this disclosure describes a multiple circuit receptacle system 100, illustrated in FIGS. 1-25. This multiple circuit receptacle system 100 can be characterized as a prior art system. Following the description of this system, the embodiments of DC receptacle blocks in accordance with the invention will be described.

The multiple circuit receptacle system 100 provides for the presentation, at outlet receptacles of an outlet receptacle block, of a selected one of a plurality of power supply circuits, and changing to a different selected one of the plurality of power supply circuits, without requiring the use of any tools, multiple receptacle blocks, multiple junction blocks, any changes in structure or physical orientation of junction blocks, or any additional elements, such as circuit adapters or the like. Instead, circuit selection is achieved by reconfiguring the physical orientation of the outlet receptacle block, relative to its interconnection to a power supply junction block. In the particular embodiment disclosed herein, an 8-wire system is described, with the capability of selecting any one of four power supply circuits.

More specifically, and particularly with reference to FIGS. 1-15, the multiple circuit receptacle system 100 comprises a junction block 102 having a housing 104. The housing 104 may have a substantially symmetrical structure and be manufactured and assembled as two opposing and substantially identical halves 106 and 108. The halves can be assembled and interconnected together through various connecting means such as screws or the like (not shown) secured through lugs 110 mounted or otherwise integrally formed on the upper surface of a top portion 112 of the housing 104.

The junction block 102 is relatively conventional in design and, as an example, can be adapted to be secured at its upper portion to a raceway (not shown) or similar structure for housing electrical components in modular office systems and the like. More specifically, the means for mounting the junction block 102 to a raceway can include the use of mounting brackets 114 having L-shaped configurations as illustrated in FIG. 1, and positioned on or otherwise integral with the top portion 112 of the housing 104. The means for mounting the junction block 102 can also include latch members 116, 118 also mounted to or otherwise integral with the top portion 112 of the housing 104. The mounting brackets 114 can engage corresponding support brackets (not shown) attached to a structural member of the raceway (not shown). Correspondingly, the latch members 116, 118 can be made to engage a retaining tab (not shown) or the like of the raceway. The use of these types of mounting assemblies and their attachment to structural members of raceways are disclosed in Byrne, U.S. Pat. No. 5,259,787 issued Nov. 9, 1993 and Byrne, U.S. Pat. No. 4,993,576 issued Feb. 19, 1991.

Figure 2:
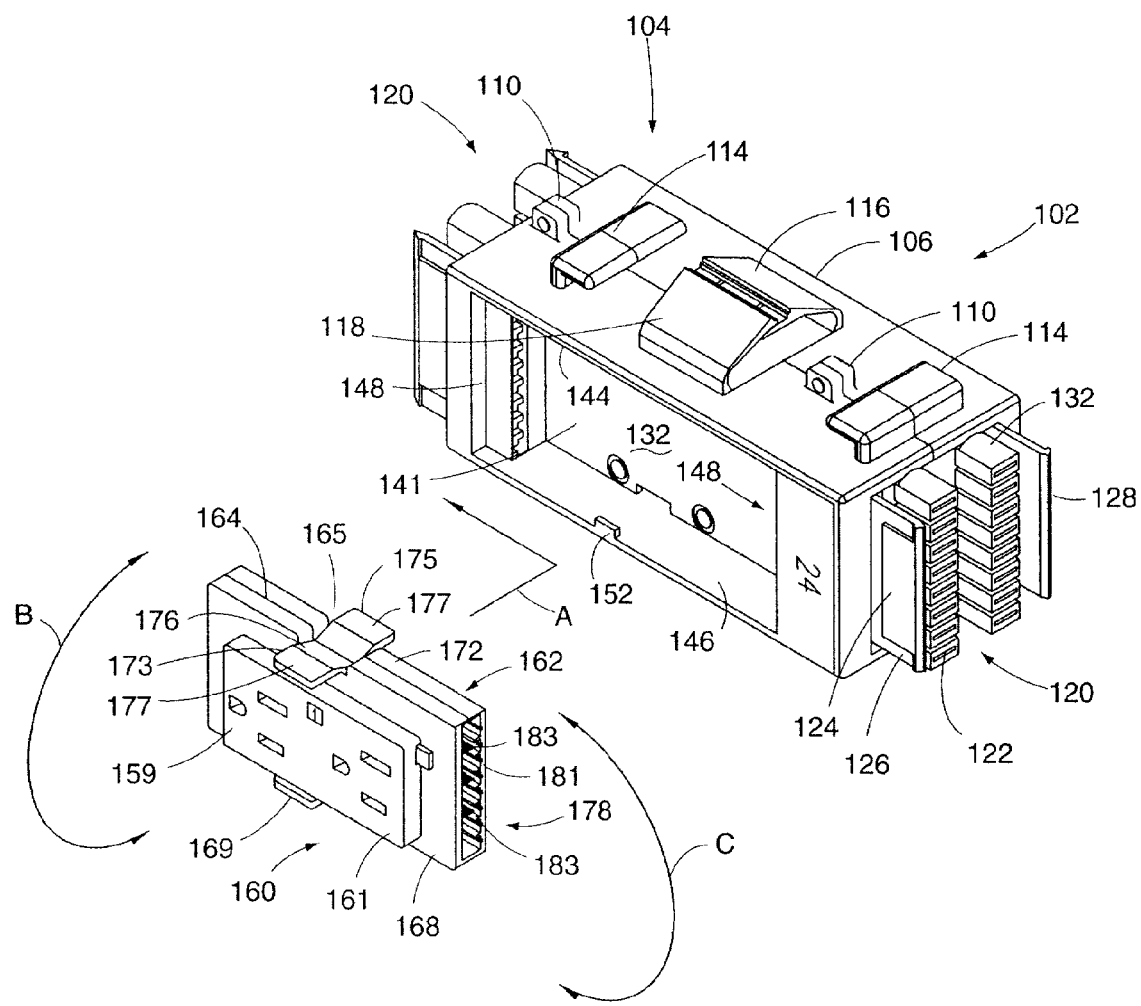
FIG. 2 is a perspective and partially exploded view similar to FIG. 1, but illustrating the opposing side of the junction block, and with a second plurality of terminals representing the plurality of different electrical circuits referred to with respect to FIG. 1.

Referring again to FIGS. 1-15, the junction block 102 includes female connector block pairs 120 extending outwardly from opposing ends of the junction block 102. FIG. 1 illustrates one of the female connector block pairs 120. The junction block 102 is symmetrical in nature, and FIG. 2 illustrates the other of the female connector block pairs 120. The female connector block pairs 120 are similar and symmetrical in nature. Each of the female connector block pairs 120 comprises a pair of female connector sets 122.

Figure 11:
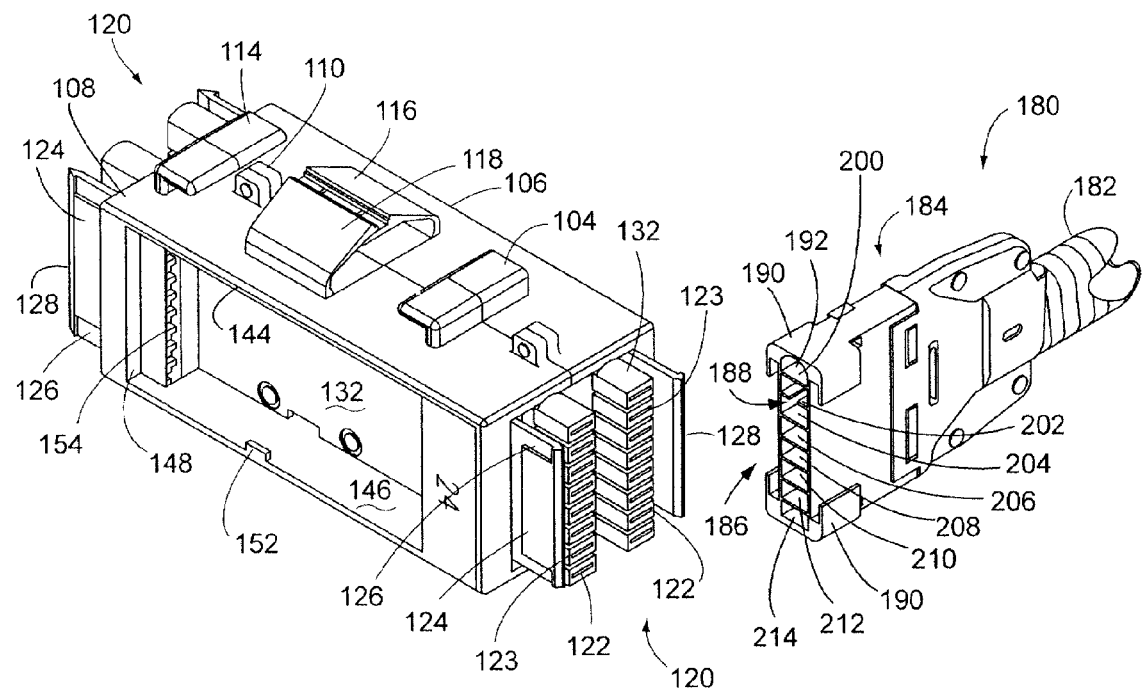
FIG. 11 is a perspective view of the electrical junction block illustrated in FIG. 1, with a cable assembly which may be electrically interconnected to the junction block.
Figure 12:
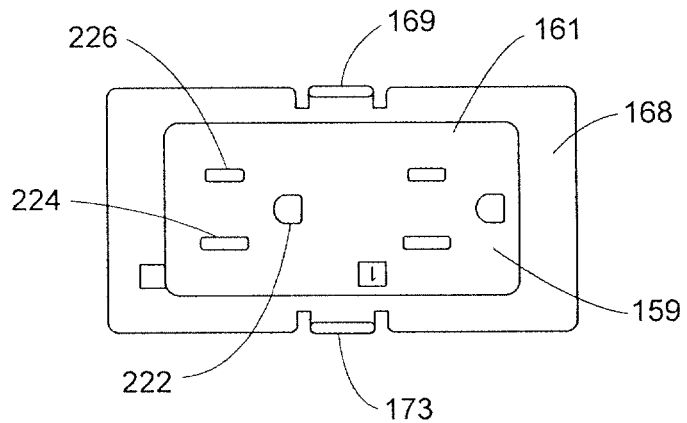
FIG. 12 is an elevation view of one side of the outlet receptacle block illustrated in FIG. 1.

Each of the female connector sets 122 is adapted to be releasably engaged with cable assemblies or similar electrical means for supplying incoming power to the junction block 102 or, alternatively, routing power from or through junction block 102 to other junction blocks (not shown) or other electrical devices. Such a cable assembly may, for example, comprise a cable assembly 180 illustrated in part in FIG. 11. The cable assembly 180 includes a cable or conduit section 182. The cable or conduit section 182 is mechanically and electrically connected to a male connector block 184. The male connector block 184 includes, at its terminating end, a male connector set 186 comprises a plurality of male connector terminals 188. In FIG. 11, the male connector terminals 188 are not actually expressly shown, but instead are located within the individual compartments of the male connector set 186. The male connector block 184 and cable or conduit section 182 is adapted to be interconnected to appropriate energy sources so as to provide electrical power to electrical receptacle blocks (subsequently described herein) through the junction block 102. For example, the cable assembly 180 may be directly interconnected to an incoming power feed cable (not shown) or the like. Also, with the use of a plurality of junction blocks 102, cable assembly 180 may be utilized to electrically interconnect junction block 102 with other junction blocks or, alternatively, to other electrical apparatus. For example, the cable assembly 180 may be interconnected to extension cables or similar means for electrical interconnections to other devices over relatively long distances. Returning to the end comprising the male connector set 186, the male connector terminals 188 of the connector set 186 are adapted to mechanically and electrically engage with any one of the female connector sets 122. As illustrated in several of the drawings, including FIGS. 1 and 11, the female connector sets 122 include corresponding female connector terminals 123.

More specifically, each of the female connector sets 122 of one of the female connector block pairs 120 is provided with a side flange 124 having upper and lower recessed areas 126. The upper and lower recessed areas 126 are adapted to assist in providing engagement with flanges 190 of the male connector block 184 associated with the cable assembly 180. In this manner, a releasable locking engagement can be provided between a female connector set 122 and the male connector set 186. The side flanges 124 are preferably made of a resilient plastic material and formed integral with the housing of the junction block 102. Preferably the side flanges 124 are also provided with an outwardly extending inclined end surface 128. When the surfaces 128 are engaged by flanges, such as the flanges 190 of the male connector block 184, the side flanges 124 will be deflected inwardly, allowing the flanges 190 of the male connector block 184 to engage the upper and lower recessed areas 126, so as to provide a releasable locking engagement of the male connector set 186 and the female connector set 122. For purposes of releasing a cable assembly 180 mechanically and electrically interconnected to a junction block 102 through the female connector set 122 and male connector set 186, pressure may be exerted inwardly on the corresponding side flange 124, the flanges 190 of the male connector block 184 will then be released from the recesses 126, and the male connector set 186 can then be retracted from the female connector set 122. In addition to the foregoing, a "keying" arrangement may be utilized for interconnecting the cable assembly 180 to the junction block 102. In this regard, each of the female connector sets 122 may be provided with a key lug 132 at the top portion thereof, as illustrated in FIGS. 1 and 11. Correspondingly, the male connector set 186 may be provided with a key opening 192 for receiving the key lug 132.

The remaining elements of the junction block 102 will now be described primarily with respect to FIGS. 1, 2 and 3. With reference thereto, the housing 104 of the junction block 102 includes a pair of spatial areas 140, 141 which are formed on opposing sides of the junction block 102. In FIGS. 1 and 2, only one of each of the spatial areas 140, 141 is shown. Each of the spatial areas 140, 141 is formed through an interior back wall 132, upper wall 144, lower wall 146 and a pair of opposing end walls 148. Extending upwardly from the lower wall 146 along a front edge thereof is an upwardly projecting locking tab 152. The spatial areas 140, 141 are utilized to accommodate electrical outlet receptacle blocks, such as the receptacle block 160 illustrated in FIGS. 1, 2, 3, 4 and 12-15, and described in greater detail in subsequent paragraphs herein. The locking tab 152 is utilized to releasably secure the receptacle block 160 in a position electrically connected to the junction block 102, as also described in subsequent paragraphs herein.

For purposes of energizing the electrical outlet receptacles blocks 160, the junction block 102 includes, within each spatial area 140, a female receptacle connector set 154, as primarily illustrated in FIGS. 1, 2, 3 and 11. Because FIG. 1 illustrates only one of the spatial areas 140, 141, only one of the female receptacle connector sets 154 is illustrated in FIG. 1. With reference to FIGS. 1 and 2, the female connector set 154 associated with each spatial area 140, 141 is located on what may be characterized as a "left-side" of one of the end walls 148, as the spatial area 140 or 141 is viewed looking directly toward the spatial area 140 or 141, with the junction block 102 having an orientation so that the latch members 116, 118 are at the top. The female receptacle connector set 154 in each recess 140 of the junction block 102 includes a series of female connector terminals 156 having a vertically disposed alignment as illustrated in FIGS. 1, 2, 3 and 11.

Figure 13:
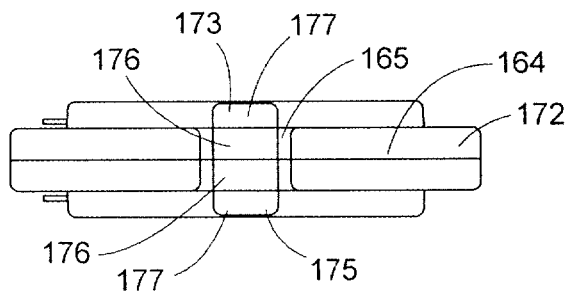
FIG. 13 is a plan view of the electrical outlet receptacle block illustrated in FIG. 1.
Figure 14:
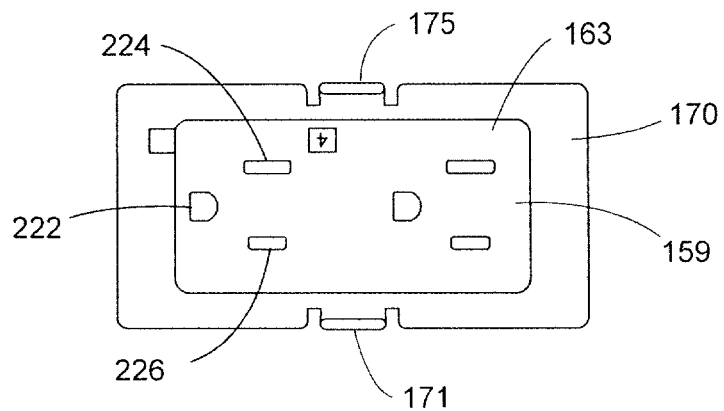
FIG. 14 is an elevation view of the electrical receptacle block shown in FIG. 1, showing the opposing side of the side of the electrical receptacle block illustrated in FIG. 12.

The electrical outlet receptacle block 160 will now be described with respect to FIGS. 1, 2, 3, 4 and 12-15. Referring thereto, the outlet receptacle block 160 includes a housing 162. The housing 162 comprises two symmetrical halves interconnected together along the seam 164 illustrated in FIG. 1 and the seam 166 illustrated in FIG. 4. Any suitable and well known means may be utilized for rigidly securing together the halves of the housing 162. One of the halves of the housing 162 includes a first facial wall or surface 168 (illustrated in FIGS. 1, 2, 3 and 14). The other opposing half of the housing 162 includes a corresponding second facial wall or surface 170. The second facial wall or surface 170 is illustrated in FIG. 14. Further, the two halves of the housing 162 together form an upper wall 172 (illustrated in FIGS. 1, 2 and 13), and a corresponding lower wall 174 (illustrated in FIGS. 4 and 15). Although the description of the electrical outlet receptacle block 160 is referring to "upper" and "lower" walls 172, 174, respectively, it should be emphasized that with the use of the outlet receptacle block 160 in accordance with invention, the receptacle block 160 will be electrically interconnected to the junction block 102 in four different physical orientations. Accordingly, references to "upper" and "lower" portions of the receptacle block 160 should not be taken to mean that any such portions or elements are always in such orientations.

Figure 15:
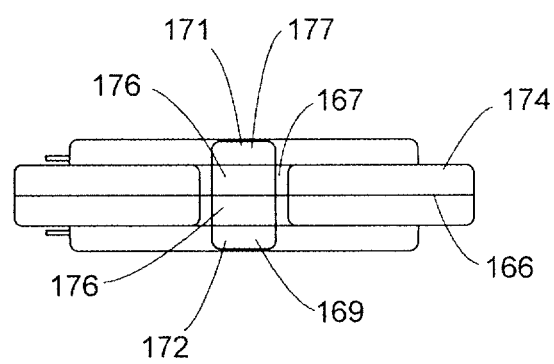
FIG. 15 is an underside view of the electrical receptacle block shown in FIG. 1.

The outlet receptacle block 160 further comprises a pair of opposing receptacle faces, namely a first receptacle face 161 (illustrated in FIGS. 1, 2, 3 and 12), and a second receptacle face 163 opposing the first receptacle face 161 and illustrated in FIG. 14. As further illustrated, located on each of the first receptacle face 161 and second receptacle face 163 are a pair of three-pronged receptacles 159. The receptacles 159 each include a hot conductor, neutral conductor and ground conductor. As illustrated in several of the drawings, including FIGS. 12-15, each of the upper and lower walls 172, 174, respectively, formed centralized grooves 165 and 167, respectively. That is, the groove 165 is associated with the upper wall 172, while the groove 167 is associated with a lower wall 174. Positioned within the groove 167 associated with the lower wall 174 are a pair of locking latches, namely a first locking latch 169 (FIGS. 1, 2, 3, 14 and 15), and second locking latch 171 (FIGS. 4, 14 and 15). Each of the locking latches 169,171 is substantially identical in structure. Correspondingly, positioned within the groove 165 associated with the upper wall 172 are another pair of locking latches, namely another first locking latch 173, and a second locking latch 175. These locking latches are illustrated in FIGS. 1, 2, 3, 13 and 15. With reference primarily to FIGS. 4 and 13, each of the locking latches 169, 171, 173 and 175 include as an inclined portion 176 integral with or otherwise connected to an upper wall 172 or lower wall 174, within one of the grooves 165 or 167. Extending outwardly from each of the inclined portions 176 is an outer tab 177. Each of these locking latches is resilient in nature. For example, with respect to the first locking latch 169, and with the position shown in FIGS. 1 and 4, upwardly directed forces on the first locking latch 169 will cause the locking latch to deflect and bend upwardly relative to its connection to the lower wall 174. Further, however, the first locking latch 169, as with the other locking latches, is of a resiliency such that after the upwardly directed deflecting forces are removed, the first locking latch 169 will return to its conventional and normal position, as illustrated in FIGS. 1 and 4. Each of the locking latches may consist of a resilient plastic material, such as polycarbonate. Such material permits deflection in the presence of external forces, and also exhibits internal restoring forces when the deflecting forces are removed. Such locking latches are well known in the art. The use of the locking latches for releasably securing the outlet receptacle block 160 in an electrical interconnection with the junction block 102 will be described in subsequent paragraphs herein.

Figure 3:
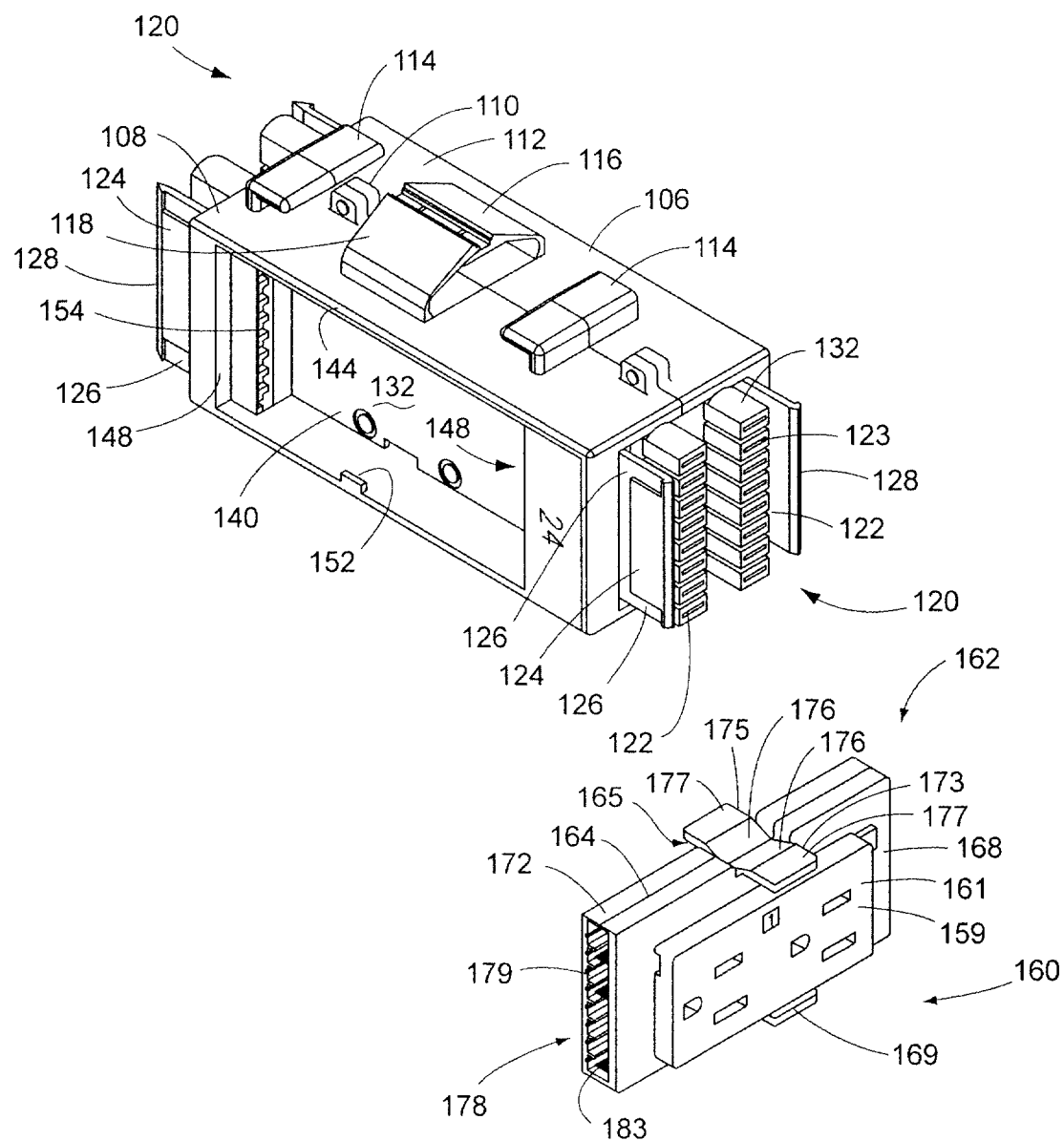
FIG. 3 is a further perspective and partially exploded view similar to FIG. 1, but illustrating the electrical outlet receptacle block in a reverse perspective view, so as to illustrate the particular connector set of the receptacle block which would be electrically interconnected to a connector set of the electrical junction block, assuming that the electrical outlet receptacle block is moved from the position illustrated in FIG. 1 into the electrical junction block through movement along arrow line A shown in FIG. 1.
Figure 4:
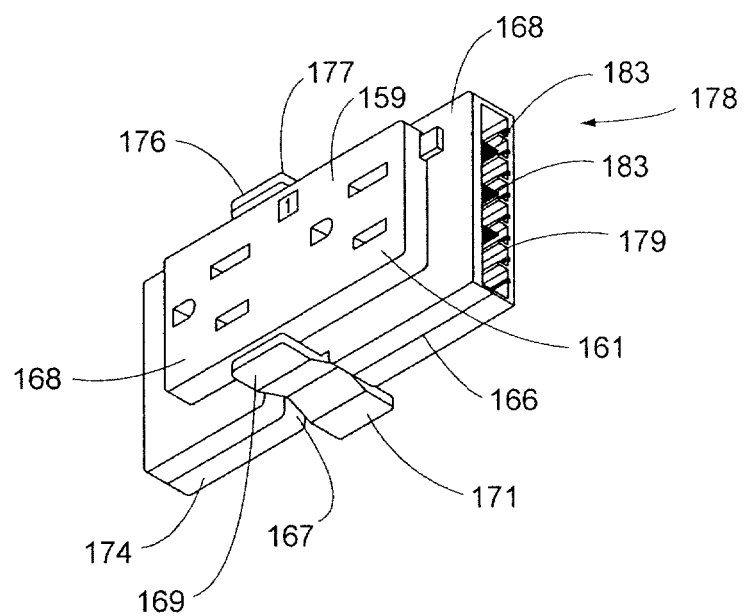
FIG. 4 is a perspective view of the electrical outlet receptacle block illustrated in FIGS. 1 and 2, with the view being a reversed perspective view so as to show the underside thereof.

The electrical outlet receptacle block 160 further includes a pair of male connector sets 178, with each of the male connector sets 178 extending outwardly from opposing ends of the receptacle block 160 as illustrated in several of the drawings, including FIGS. 1, 2 and 3. For purposes of description, the individual ones of the pair of male connector sets 178 are designated as the first male connector set 179 (illustrated in FIGS. 1 and 2), and second male connector set 181 (illustrated in FIG. 3). Each of the male connector sets 179, 181 include a particular configuration of male or bus bar terminals 183. For reasons apparent after subsequent description herein, the male terminals 183 exist only within certain of the connectors of the first and second male connector sets 179, 181.

Figure 8:
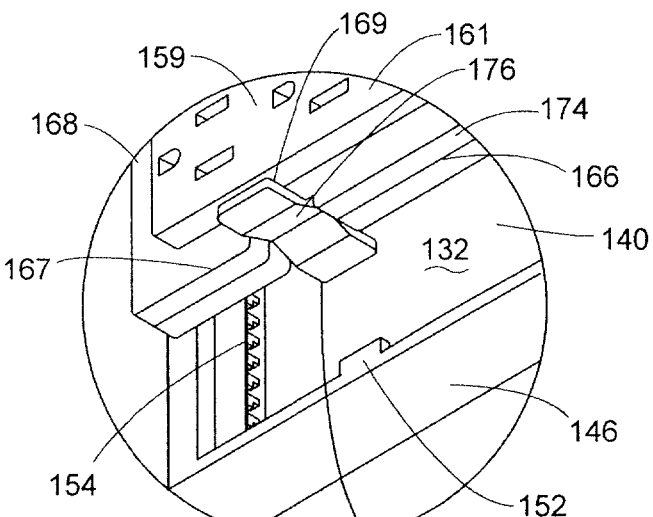
FIG. 8 is a partial perspective view of an electrical outlet receptacle block as illustrated in FIG. 4, illustrating the particular locking latch which is in an underside position, and further showing its position relative to the locking tab of the electrical junction block as the outlet receptacle block is being moved into an electrically engaging position with the junction block in a circuit 1 orientation.
Figure 9:
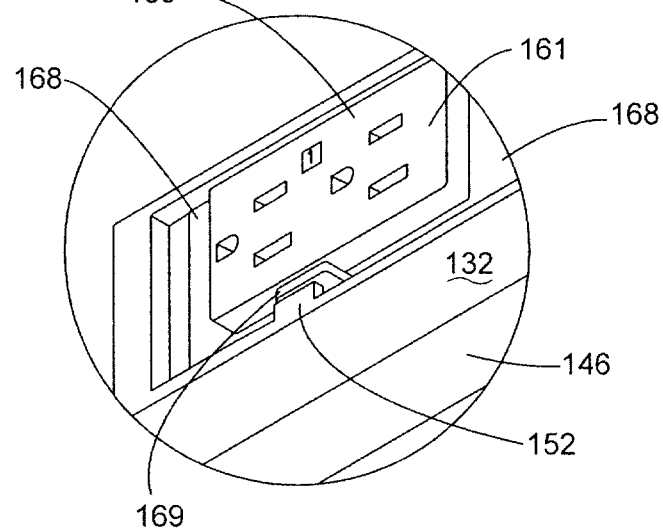
FIG. 9 is a partial perspective view similar to FIG. 8, and illustrating the locking latch of the outlet receptacle block being pushed upwardly by the locking tab of the junction block as the receptacle block is moved into the electrically engaging position.

The releasable and electrical interconnection of the outlet receptacle block 160 to the junction block 102 will now be described primarily with respect to FIGS. 1 and 6-10. As earlier mentioned, and as described in greater detail in subsequent paragraphs herein, the electrical outlet receptacle block 160 is capable of being electrically interconnected to the junction block 102 in any one of four physical orientations, so as to provide the capability of the receptacles of the outlet receptacle block 160 being electrically interconnected to any one of four incoming circuits. For purposes of description of these concepts and the procedure for interconnecting the outlet receptacle block 160 to the junction block 102, the particular configuration of the outlet receptacle block 160 as illustrated in FIG. 1 (and FIG. 16) is referred to herein as the "circuit 1 orientation." With reference to FIG. 1, and for purposes of interconnecting the outlet receptacle block 160 to the junction block 102 in the circuit 1 configuration, the outlet receptacle block 160 can first be positioned as illustrated in FIG. 1, relative to the junction block 102. For purposes of interconnection, the receptacle block 160 will be moved in a direction illustrated by arrow line A shown in FIG. 1. More specifically, and with reference to a "starting" position as illustrated in FIG. 8, the receptacle block 160 can be aligned with the junction block 102 so that the first and second locking latches 169, 171, respectively are in alignment and positioned slightly above the locking tab 152 of junction block 102.

As the receptacle block 160 is moved into the spatial area 140, the position of the locking tab 152 relative to the first locking latch 169 will cause the inclined portion 176 and outer tab 177 of the first locking latch 169 to deflect upwardly as the receptacle block 160 is moved into the spatial area 140. The spatial area 140 is of a sufficient depth and other dimensions so that the receptacle block 160 can be fully inserted into the spatial area 140. After insertion of the receptacle block 160 into the junction block 102, with the first locking latch 169 deflected upwardly by the tab 152, the receptacle block 160 can be moved to the "left" as illustrated by the arrow line A in FIG. 1. As the receptacle block 160 is moved to the left within the spatial area 140, two processes occur simultaneously. Specifically, the first male connector set 179 (FIG. 3) moves into an electrical engagement with the female connector set 154 located on one of the end walls 148 of the junction block 102. As earlier mentioned, the first male connector set 179 will have male terminals 183 only within certain of the connectors of the connector set 179. Accordingly electrical connections will be made between the male terminals 183 and only certain of the female connector terminals 156 of the connector set 154.

Figure 10:
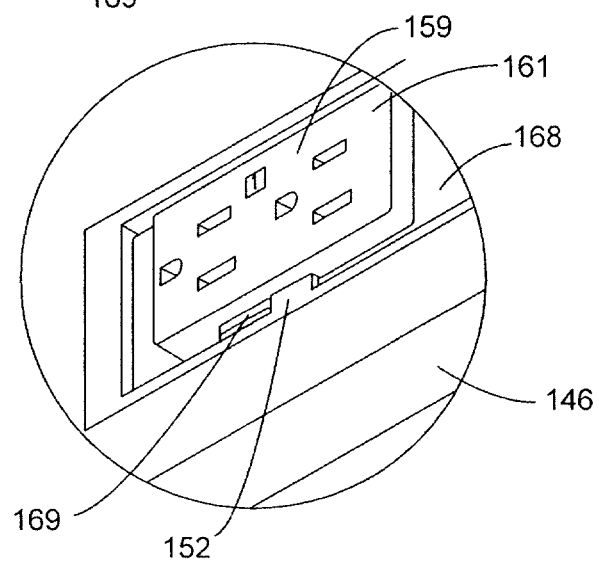
FIG. 10 is a partial perspective view similar to FIGS. 8 and 9, and illustrating the relationship of the locking latch of the outlet receptacle block relative to the locking tab of the junction block when the receptacle block is fully and electrically engaged with the junction block.

At the same time that electrical interconnection is being made between the receptacle block 160 and the junction block 102, and as the receptacle block 160 is being moved to the left within the spatial area 140 of the junction block 102, movement to the left by a sufficient distance will cause the first locking latch 169 to be moved past the locking tab 152. When the first locking latch 169 is fully moved to the left of the locking tab 152, the upwardly directed external forces exerted by the locking tab 152 are no longer applied to the first locking latch 169, and the first locking latch 169 moves downwardly to its "normal" position, i.e. its configuration in the absence of any externally applied forces (FIG. 10). This configuration of the first locking latch 169 and the locking tab 152 is illustrated by the solid line configuration of the outer tab 177 of the first locking latch 169 as illustrated in FIG. 7, and as also illustrated in the partial view of FIG. 10. With the first locking latch 169 in the position shown in solid line format in FIG. 7 and in FIG. 10, the receptacle block 160 cannot be removed from its electrical engagement with the junction block 102, in the absence of external forces exerted in a specific direction on the first locking latch 169. That is, any attempt to move the receptacle block 160 directly to the "right" within the spatial area 140 of junction block 102, so as to electrically disengage the receptacle block 160 from the junction block 102 is prohibited by the position of the locking tab 152 relative to the first locking latch 169. To actually disengage and electrically decouple the receptacle block 160 from the junction block 102, upwardly directed forces must be exerted on the first locking latch 169. These forces must be sufficient so as to deflect the first locking latch 169 upwardly a sufficient distance so that the outer tab 177 is essentially "above" the top of the locking tab 152. In this configuration, the first locking latch 169 is permitted to move to the "right" and above the locking tab 152. This "freedom" of movement correspondingly permits the male terminals 183 of the first male connector set 179 to be electrically disengaged from the female connector terminals 156 of the connector set 154 of junction block 102.

The foregoing has been a description of the process for electrical interconnection of the receptacle block 160 to the junction block 102 when the receptacle block 160 is to be in the circuit 1 orientation. As will be apparent from subsequent description, the other three circuit orientations of the receptacle block 160 which may be utilized in accordance with the invention will cause one of the second, third or fourth locking latches 171, 173 and 175, respectively, to be in the physical position and orientation of the first locking latch 169 for the circuit 1 orientation as illustrated in FIGS. 1 and 5.

The concepts of the invention specifically relating to the capability of providing for interconnection of a single outlet receptacle block to a selected one of a plurality of circuits will now be described, primarily with reference to FIGS. 16-27. Specifically, the multiple circuit receptacle system 100 can be characterized as an "8-wire" system, although the principles of the invention are not limited to only 8 wire system. In the 8 wire systems disclosed herein, the cable assembly 180 includes 8 wires (not specifically shown) inside the conduit section 182, each of which is electrically connected to a different one of the terminal blades (not shown) located in the male connector terminals 188 of the male connector set 186.

The 8-wire system comprises a series of hot, neutral and ground wires terminating on terminal blades in the connectors 188. For purposes of description, the terminals 188 themselves will be referred to as comprising hot, neutral and ground terminals. These terminals 188 are further referenced, for purposes of description, by individual reference numerals 200, 202, 204, 206, 208, 210, 212 and 214, as shown in FIG. 11. Further, the 8-wire system presented at the terminals 188 can provide four separate circuits, with each circuit consisting of three wires or terminals comprising hot, ground and neutral wires or terminals.

To electrically interconnect the receptacle block 160 to the junction block 102 for any one of the four circuits, one of either the first male connector set 179 or the second male connector set 181 of the outlet receptacle block 160 will be electrically connected to a female connector set 154 as previously described herein. However, for each of the four power supply circuits to be selectively applied to the receptacles 159, the receptacle block 160 will be in one of four different physical orientations, relative to the junction block 102. For purposes of description, the four available circuits will be identified as circuit 1, circuit 2, circuit 3, and circuit 4. The orientations of the outlet receptacle block relative to the junction block 102 for each of these circuits is designated herein as the circuit 1, circuit 2, circuit 3 and circuit 4 orientations, respectively.

To more specifically describe the foregoing concepts, the multiple circuit receptacle system 100 is described as having certain wires and terminals at the male connector set 186 associated with certain functional wires of a particular circuit. The relationship between these wires and terminals for these circuits can be defined as follows:

| Wire or Terminal | Function |
| --- | --- |
| 200 | H - 4 |
| 202 | N - 1 |
| 204 | H - 3 |
| 206 | G |
| 208 | IG |
| 210 | H - 2 |
| 212 | N - 2 |
| 214 | H - 1 | where "H-n" represents the hot wire or terminal of the nth circuit (i.e. circuit n), "N-1" represents the first neutral wire or terminal, "N-2" represents the second neutral wire or terminal, "G" represents a ground wire or terminal and "IG" represents an isolated ground or terminal.

With respect to the common and ground wires or terminals, the four circuits may be "set up" in various ways with respect to application to the receptacle block 160. As will be described in subsequent paragraphs herein, the particular circuits applied to the receptacles 159 of the receptacle block 160, and the particular hot, neutral and ground wires or terminals associated with each circuit will be dependent upon the relative positioning of male terminal blades 183 in the first and second male connector sets 179, 181, respectively. In the particular configurations and orientations of the receptacle block 160 chosen for the exemplary embodiment 100 of a multiple circuit receptacle system in accordance with the invention, each of the particular circuits have the following wires or terminals electrically coupled to terminal blades 158 of the male connector sets 179, 181:

| Circuit No. | Wire or Terminal |
|---|---|
| 1 | H - 1 (214) |
| | N - 1 (202) |
| | G (206) |
| 2 | H - 2 (210) |
| | N - 1 (202) |
| | G (206) |
| 3 | H - 3 (204) |
| | N - 2 (212) |
| | IG (208) |
| 4 | H - 4 (200) |
| | N - 2 (212) |
| | IG (208) |

To more fully explain the invention, the individual connectors of the first and second male connector sets 179, 181, respectively, of the receptacle block 160 will be numbered, with the corresponding numbers of wires or terminals of the cable assembly 180. That is, for example, connector 200 of the connector set 181 as illustrated in FIG. 1 would be electrically coupled to wire or terminal 200 of the cable assembly 180, assuming that a bus bar terminal 183 existed in connector 200 of the connector set 181, the connector set 181 was electrically connected to female connector set 154 of the junction block 102, and the cable assembly 180 was connected to one of the female connector sets 122 of the junction block 102.

For further purposes of understanding, each of the corners of the outlet receptacle block 160 is consecutively numbered 1, 2, 3 or 4, as primarily shown in FIGS. 20-23. This numbering will be used to facilitate describing the various physical orientations of the receptacle block 160 when connected to the junction block 102. Still further, and again for purposes of full description, the male terminal blades 183 of the first and second male connector sets 179, 181 of the receptacle block 160 are characterized herein as being integral with bus bars of the receptacle block 160, namely bus bars 216, 218 and 220. These bus bars are primarily illustrated in FIGS. 20-23. Further, each of the receptacles 159 is characterized as comprising a ground receptacle terminal 222, neutral receptacle terminal 224 and hot receptacle terminal 226. Each of the receptacles 159 is adapted to be electrically coupled to a grounded electrical plug, having a ground prong adapted to be coupled to the ground terminal 222, large blade adapted to be connected to the neutral receptacle 224, and small blade adapted to be inserted into hot receptacle 226. The ground terminals 222 are connected to the bus bar 218, while the neutral terminals 224 are connected to bus bar 216 and the hot terminals 226 are connected to the bus bar 220. The bus bar 218 can be characterized as the ground bus bar, while the bus bar 216 can be characterized as the neutral bus bar and the bus bar 220 can be characterized as the hot bus bar.

Figure 20:
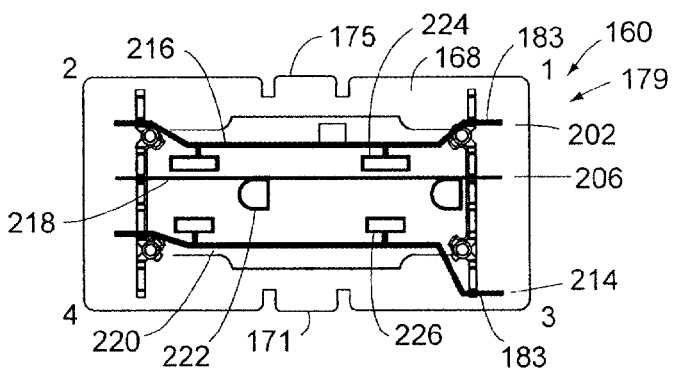
FIG. 20 is a sectional elevation view of the outlet receptacle block illustrated in FIG. 1, and showing the particular spatial configuration corresponding to FIG. 16 with a circuit 1 configuration (looking outwardly from the backside of first facial wall 168)

The various physical orientations of the receptacle block 160, and their associated circuit selections, will now be described. A circuit 1 configuration can be achieved by moving the receptacle block 160 through the path indicated by arrow line A in FIG. 1. This circuit 1 configuration is also illustrated in FIG. 16, which illustrates the second male connector set of the receptacle block 160. For a circuit 1 configuration, the receptacle block 160 is electrically coupled with the female connector set 154 being electrically connected to the second male connector set 181, and with the first locking latch 169 being located at the bottom of the receptacle block 160. For this circuit 1 configuration, the receptacle block is in a circuit 1 orientation, as also illustrated in FIG. 1. In this orientation, and as illustrated in FIG. 20, the blades 183 of the bus bars 216, 218 and 220 exist in terminal locations 202 (corresponding to N-1), 206 (corresponding to G) and 214 (corresponding to H-1), respectively. That is, circuit 1 is achieved with the physical orientation of the receptacle block 160 shown in FIGS. 1, 16 and 20. In this configuration, and with the particular view illustrated in FIG. 20, corner 1 is at the top right-hand corner of the receptacle block 160.

Figure 21:
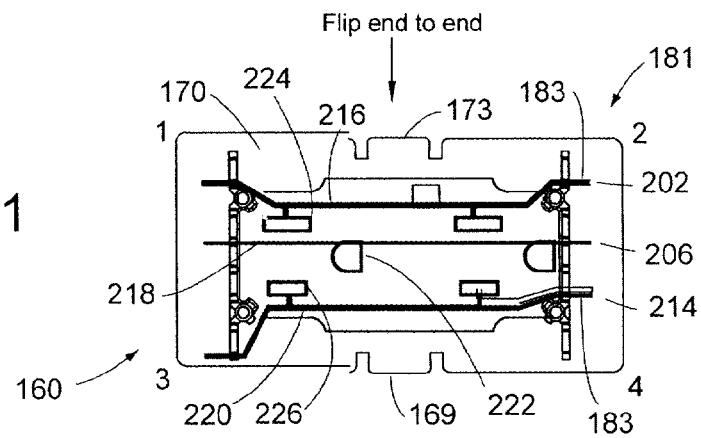
FIG. 21 is a sectional elevation view of the outlet receptacle block similar to FIG. 20, but showing the circuit 2 orientation corresponding to the configuration of the receptacle block illustrated in FIG. 17 (looking outwardly from the backside of second facial wall 170)

To achieve the circuit 2 configuration, the receptacle block 160 can be removed from the junction block 102 (in the manner previously described herein), and "flipped" end-to-end, so as to have the circuit 2 orientation as illustrated in FIG. 21. This circuit 2 orientation corresponds to providing the circuit 2 configuration for the receptacles 159. In this instance, the male terminal blades 183 to be electrically connected to corresponding connectors in the female connector set 154 correspond to wire or connector positions 202 (N-1), 206 (G) and 210 (H-2). Accordingly, the circuit 2 configuration consists of electrical connection between the receptacles 159 and cable assembly wires H-2, N-1 and G. This configuration is not only shown in FIG. 21, but is also illustrated in FIG. 17. In this configuration, it is the male connector set 181 which is electrically coupled to the female connector set 154 of the junction block 102.

Figure 22:
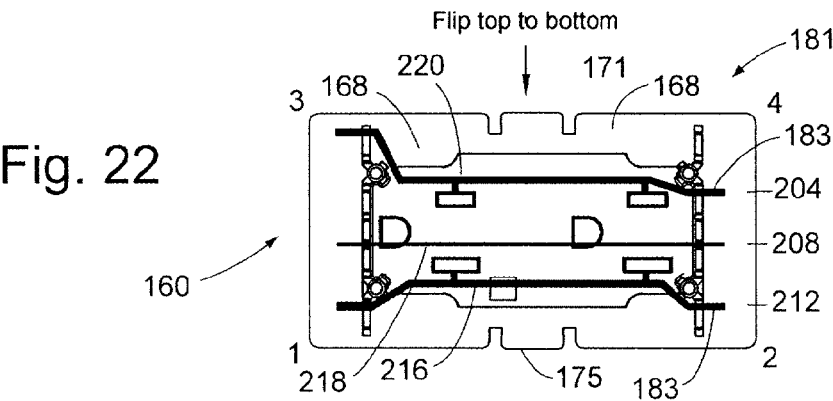
FIG. 22 is a sectional elevation view similar to FIG. 21, and further showing the circuit 3 orientation corresponding to the configuration of the receptacle block illustrated in FIG. 18 (looking outwardly from the backside of first facial wall 168)

Assuming that the receptacle block 160 has been in the circuit 2 orientation in the junction block 102, the receptacle block 160 can be removed from the junction block 102 and "flipped" from the top to the bottom so as to achieve a circuit 3 orientation as illustrated in FIGS. 18 and 22. In the circuit 3 orientation, the male terminal blades 183 which are interconnected to the female connector set 154 are in connector positions 204 (H-3), 208 (IG) and 212 (N-2). Accordingly, a circuit 3 configuration would consist of electrical interconnection of the receptacles 159 to the wires or connectors H-3, N-2, and IG. A circuit 3 configuration thus provides for an isolated ground. This configuration is illustrated in FIGS. 18 and 22. In this configuration, the male connector set 181 of the receptacle block 160 is electrically connected to the female connector set 154.

Figure 23:
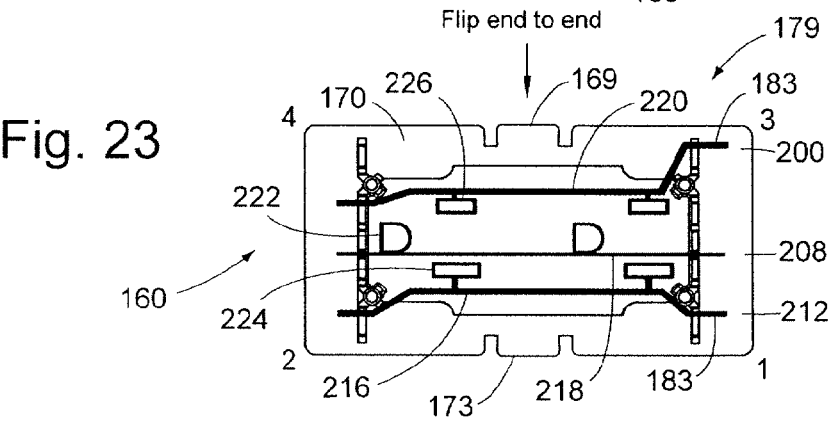
FIG. 23 is a sectional elevation view of the outlet receptacle block, similar to FIG. 22, but showing the receptacle block in a spatial configuration corresponding to a circuit 4 orientation, and further corresponding to the configuration of the outlet receptacle block as illustrated in FIG. 19 (looking outwardly from the backside of second facial wall 170)

With reference to FIGS. 18 and 22, the receptacle block 160 can be "flipped" end-to-end so as to provide for a circuit 4 orientation of the receptacle block 160. This circuit 4 orientation is primarily illustrated in FIGS. 19 and 23. With the receptacle block 160 in a circuit 4 orientation so as to provide for an electrical circuit 4 configuration, the male connector set 179 of the receptacle block 160 will be electrically connected to the female connector set 154 of the junction block 102. The electrical connection will be made as shown in FIG. 23, with the end of the hot bus bar 220 being located at the connector position 200 (corresponding to H-4), while the end of the ground bus bar 218 projects outwardly from the second male connector set 181 at connector location 208 (corresponding to IG). This location of the bus bar 218 will provide for an isolated ground. The neutral bus bar 216 has its end projecting outwardly through the male connector set 179 at connector position 212 (corresponding to N-2).

It should be noted that for purposes of understanding, FIG. 20 illustrates the first facial wall 168 from the backside of the same. That is, in viewing FIG. 20, the male terminal blades 183 of the bus bars 216, 218 and 220 project outwardly through the second male connector set 179 located to the right side of the receptacle 160 as viewed in FIG. 20. Correspondingly, FIG. 21, illustrating the circuit 2 orientation of the receptacle block 160, represents a view of the second facial wall 170 from the backside thereof. For the circuit 2 orientation as shown in FIG. 21, the blades 183 of the bus bars 216, 218 and 220 project outwardly through the male connector set 181 located on the right side of the view of the receptacle block 160 as shown in FIG. 21. For the circuit 3 orientation of the receptacle block 160, FIG. 22 illustrates the first facial wall 168 from the backside thereof. Blades 183 of the bus bars 216, 218 and 220 project outwardly into the male connector set 181 at the right side of FIG. 21. Still further, for the circuit 4 orientation illustrated in FIGS. 19 and 23, and specifically with respect to FIG. 23, the backside of the second facial wall 170 is shown in FIG. 23. The male terminal blades 183 of the bus bars 216, 218 and 220 project into the male connector set 179 located at the right side of the receptacle block 160, as viewed in FIG. 23.

To further insure an understanding of the various orientations of the receptacle block 160 for each of the four individual circuits, reference is again made to the individual receptacles 159 of the receptacle block 160. For a circuit 1 orientation of the receptacle block 160, as illustrated in FIGS. 16 and 20, the receptacles 159 on the first receptacle face 161 will be available to the user for acquiring power from the circuit 1 configuration. These same receptacles 159 presented at the first receptacle face 161 will also be available to the user for the circuit 3 configuration when the receptacle block 160 is in a circuit 3 orientation, as illustrated in FIGS. 17 and 21. Correspondingly, the receptacles 159 presented at the second receptacle face 163 will be available for to the user in the circuit 2 configuration and circuit 4 configuration, represented by the receptacle block being in the circuit 2 orientation and circuit 4 orientation as illustrated in FIGS. 17, 21 and 19, 23, respectively.

Figure 24:
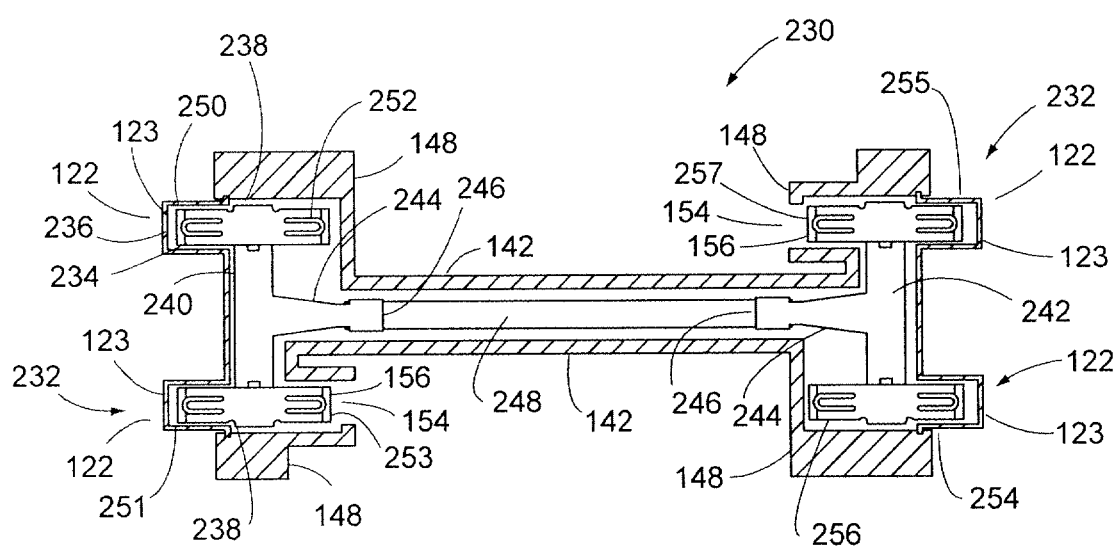
FIG. 24 is a plan view of one conductor assembly of the electrical junction block illustrated in FIG. 1, and further illustrating the conductor assembly as comprising a pair of H-block terminals having female connectors.

For a complete and full understanding of the electrical components utilized for providing the multiple circuit receptacle system 100 in accordance with the invention, reference is made to FIG. 24. Specifically, FIG. 24 illustrates a plan sectional view of junction block 102 (through section lines 24-24 of FIG. 1). This plan sectional view illustrates one connector assembly 230 which is utilized to bring incoming power through a female connector set 122 to one of the female conductor sets 154 and/or through the junction block 102 and outwardly through another of the female connector sets 122. Although only one connector assembly 230 is illustrated in FIG. 24, it should be understood that with the 8-wire system and the particular junction block 102 illustrated in FIG. 1, eight connector assemblies 230 will be assembled as part of the junction block 102. The eight connector assemblies 230 will be essentially "stacked" one on top of the other in a vertical disposition. The connector assemblies 230 can be secured within the junction block 102 and electrically isolated from one another in any conventional and well-known manner.

Turning specifically to the connector assembly 230 illustrated in FIG. 24, the connector assembly 230 is shown in its position relative to other elements of the junction block 102, such as the back walls 142 and end walls 148. The connector assembly 230 includes a pair of universal electrical contacts 232, positioned on opposing ends of the connector assembly 230. Each of the universal electrical contacts 232 includes four symmetrically arranged female receptacles, identified in FIG. 24 as receptacles 250-257, respectively. Receptacles 250-253 are located on the universal electrical contact 232 viewed on the left side of the drawing on FIG. 24, while female receptacles 254-257 are located on the universal electrical contact 232 shown as part of the universal electrical contact 232 on the right side of the drawing in FIG. 24. With reference back to the junction block 102 as illustrated in FIG. 1, the receptacles 250, 251, 254 and 255 each correspond to the terminals previously identified as female connector terminals 123. Correspondingly, the female receptacles 253 and 257 correspond to female connector terminals 156 previously identified as part of the female connector sets 154.

Turning to each of the individual female receptacles 250-257, each receptacle includes an upper cantilever member 234 and a lower cantilever member 236. The cantilever members 234, 236 are formed with arms 238. A bridge 240 extends between the arms 238 of the upper cantilever members 234. The upper and lower cantilever members 234, 236 are flexible and resilient in nature so as to be appropriately flexed when a male blade terminal (such as a male blade terminal projecting from the cable assembly 180 illustrated in FIG. 11) is inserted between the opposing cantilever members, thereby providing electrical contact.

Each of the universal electrical contacts 232 further includes a connecting beam 242 electrically connected by appropriate means to each of the four female receptacles of the contact 232. In turn, the connecting beam 242 is integral with or otherwise electrically connects to a transition portion 244. The transition portion 244, in turn, is connected to a channel 246. The channel 246 may, for example, be a channel which is formed by a pair of crimp wings or similar elements for providing appropriate electrical connections to other elements. In the particular embodiment illustrated in FIG. 24, each of the channels 246 is connected to an intermediate connecting wire or bus 248. The wire or bus 248 electrically interconnects the two universal electrical contacts 232. Additional detail regarding connector assemblies such as the connection assembly 230 and the universal electrical contacts 232 are disclosed in Byrne, U.S. Pat. No. 4,990,110 issued Feb. 5, 1991, and Byrne, U.S. Pat. No. 5,096,434, issued Mar. 17, 1992. The disclosures of these patents are hereby incorporated by reference herein.

One other advantageous aspect of the multiple circuit receptacle system 100 in accordance with the invention should be described. Specifically, in prior art systems, the outlet receptacle blocks are typically used in only one spatial orientation. This means that the one receptacle face (i.e. the surface where receptacles are made available to the user) and its associated ground, neutral and hot terminals are always in the same spatial orientation when electrically coupled to a particular junction block.

Figure 25:
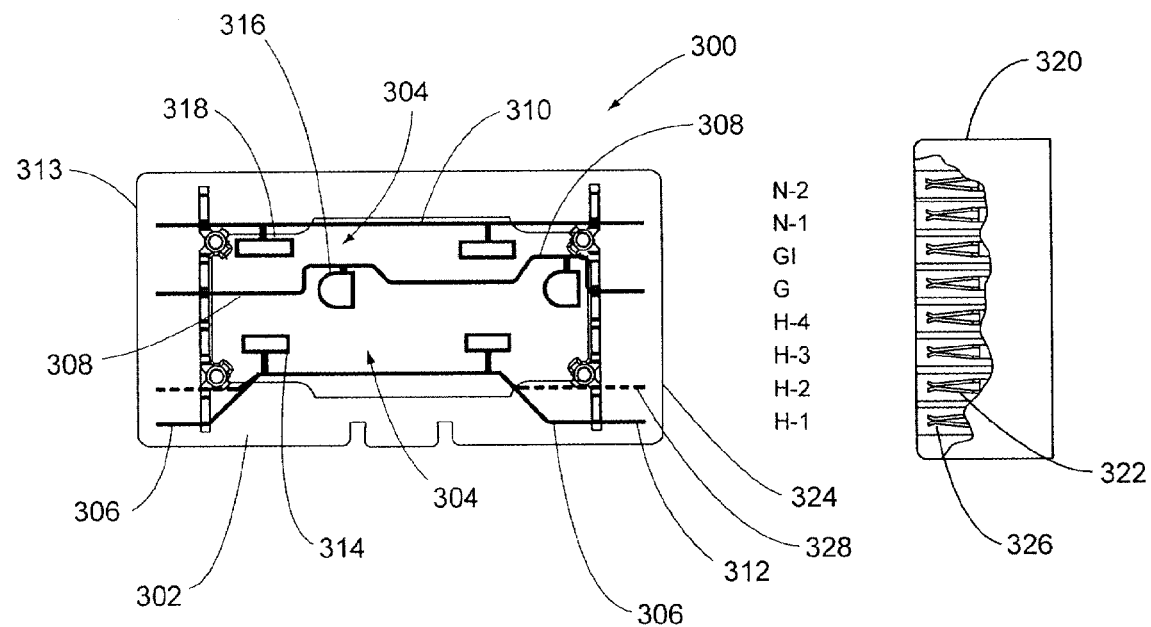
FIG. 25 is a prior art sectional elevation view of a prior art outlet receptacle block, similar to the drawings of FIGS. 20-23, and illustrating the prior art configuration of the receptacle block when hot terminals associated with the incoming plurality of electrical circuits were spaced adjacent each other, without any intervening neutral or ground terminals.

This spatial orientation limitation is shown, in part, in the sectional elevation view of a prior art outlet receptacle block 300 illustrated in FIG. 25. FIG. 25 is a view similar to the views illustrated in FIGS. 20, 21, 22 and 23, in that FIG. 25 is a view looking outwardly from the backside of a facial wall 302 of the outlet receptacle block 300. The wall 302 which is being viewed is a wall on which a pair of receptacles 304 are located. The outlet receptacle block 300 includes a set of three bus bars, namely hot bus bar 306, ground bus bar 308 and neutral bus bar 310. Further, the prior art receptacle block 300 includes, within each receptacle 304, a hot receptacle terminal 314, ground receptacle terminal 316 and neutral receptacle terminal 318. The hot bus bar 306 is connected to the hot receptacle terminal 314, while the ground bus bar 308 is connected to each of the ground receptacle terminals 316. Correspondingly, the neutral bus bar 310 is connected to each of the neutral receptacle terminals 318.

As earlier stated, the prior art outlet receptacle block 300 is adapted to have only one spatial orientation relative to an electrically coupled junction block. Accordingly, the receptacle terminals 314, 316 and 318 always remain in a single spatial orientation.

As further illustrated in FIG. 25, each of the bus bars 306, 308 and 310 terminate at one end with a set of terminals extending into a first receptacle connector set 312. At the opposing ends of the bus bars 306, 308 and 310, terminals extend into a second connector set 313. For purposes of description, FIG. 25 also illustrates a female connector set 320, which could correspond to the female receptacle connector set 154 previously described herein and illustrated in FIGS. 1, 2, 3 and 11. The female connector set 320 includes a series of female connector terminals 322 as further illustrated in FIG. 25.

With the bus bars 306, 308 and 310 having the configuration illustrated in FIG. 25, blade terminals would be formed at opposing ends of each of the bus bars, so as to form the receptacle connector sets 312 and 313. In the particular orientation illustrated in FIG. 25, one blade terminal formed at the end of the hot bus bar 306 is aligned so that a blade terminal 324 formed at the end thereof would be received within the female terminal 326 of the set of female connector terminals 322. This would correspond to connecting the outlet receptacle block 300 to a "first" hot circuit. As further shown in FIG. 25, the bus bar 306 and its corresponding blade terminal 324 could be constructed so as to be positioned at other locations on the receptacle block 300. Each of these locations would correspond to the blade terminal 324 being received within one of the four hot female connector terminals shown as the four "lowest" connector terminals of the set of connector terminals 322 of connector set 320. For example, an alternative position for the bus bar 306 and male blade terminal 324 is illustrated in dotted line format in FIG. 25, and is shown as alternative position 328. In this alternative position, the blade terminal 328 would be received within the female connector terminal which would correspond to the second hot circuit identified as "H-2." Correspondingly, FIG. 25 illustrates blade terminals at the ends of neutral bus bar 308 as being positioned so that they would be aligned with the female connector of connector set 320 which corresponds to the ground or "G" conductor. FIG. 25 also illustrates the bus bar 310 as having its male blade terminals at the terminations thereof being aligned with a first neutral conductor, corresponding to position "N-1" as shown in FIG. 25.

In accordance with the prior art outlet receptacle 300, in order for the receptacle block 300 to be utilized with any one of the four separate circuits identified as H-1, H-2, H-3 or H-4, each of the hot terminals associated with the connector set 312 must be physically adjacent at least one of the hot female connectors of the connector set 320. Accordingly, to provide for the capability of readjusting the positions of the bus bars and terminating male blade terminals, without requiring "cross over" of the bus bars, all of the hot terminals H-1 through H-4 must be adjacent to one another. This adjacency of the hot terminals, without any ground or neutral terminal positioned intermediate the hot terminals, results in a greater probability of arcing between hot terminals and other potentially dangerous situations. As further illustrated in FIG. 25, for the hot terminals associated with the receptacle 300 to be spaced such that ground or neutral terminals are intermediate thereto, at least two of the three bus bars 306, 308 and 310 would necessarily have to "overlap" each other. Again, such overlapping or other adjacency of the bus bars 306, 308 and/or 310 would lead to potential arcing and other safety considerations.

In contrast, and as primarily illustrated in FIGS. 20, 21, 22 and 23, the configuration of the outlet receptacle block 160 is such that the incoming power supply circuits can be configured so that the hot wires and terminals associated with each of the four circuits are spaced apart from the hot wire or terminal of another one of the power supply circuits, and a neutral or ground wire or terminal is spaced intermediate any two of the hot wires or terminals. Still further, this configuration is achieved without the necessity of any of the bus bars illustrated in FIG. 20, 21, 22 or 23 to be overlapped or otherwise adjacent. This provides a significant advantage for the receptacle blocks in accordance with the invention.

In accordance with the foregoing, a multiple circuit receptacle system 100 has been disclosed and illustrated, and represents an exemplary embodiment of the invention. More specifically, the receptacle system 100 illustrates the use of a receptacle block (receptacle block 160) having not only connector sets on opposing ends of the receptacle block, but also illustrates a single receptacle block having electrical receptacles (receptacles 159) mounted on receptacle faces (namely, the first receptacle face 161 and the second receptacle face 163) projecting outwardly from opposing sides of the single receptacle block 160. Still further, the foregoing description of the receptacle system 100 illustrates the concept of a single receptacle block providing for the presentation, at outlet receptacles of the block, of a selected one of a plurality of power supply circuits. The selected one of the plurality of power supply circuits is achieved by maneuvering the receptacle block into various spacial orientations, relative to the junction block through which incoming power is supplied. This capability of selecting one of a plurality of power supply circuits does not require the use of multiple receptacles, or the use of any tools for electrically connecting and disconnecting the receptacle block from the junction block. Still further, the selective multiple circuits are achieved without requiring multiple junction blocks or any changes in structure or physical orientation of junction blocks. Still further, the multiple circuits are achieved without requiring any elements additional to the receptacle block and the junction block, such as circuit adapters or the like. Instead, circuit selection circumflexion is achieved by manually reconfiguring the physical orientation of the outlet receptacle block, relative to its interconnection to the junction block.

As earlier described, the foregoing paragraphs describe a prior art multiple circuit system 100, with additional embodiments thereof. DC receptacle blocks in accordance with the invention will now be described, with respect to FIGS. 26-39. Specifically, the invention provides for the capability of making available DC power, and various receptacle configurations, within a raceway assembly carrying AC power and utilizing relatively conventional junction blocks. The concepts of electrically interconnecting an electrical receptacle block to a junction block have been described in substantial detail in previous paragraphs herein. One concept in accordance with the invention is that a DC receptacle block, comprising receptacles adapted to be electrically interconnected to DC plugs, can be electrically and physically engaged with a junction block in the same manner as it is known to engage electrical receptacle blocks with a junction block. In this case, the junction block can carry AC and DC power, or alternatively, may only carry DC power. In any event, the invention provides for DC integration into an electrical raceway assembly, while utilizing substantially the same components as are utilized when the raceway assembly carries only AC power.

Figure 32:
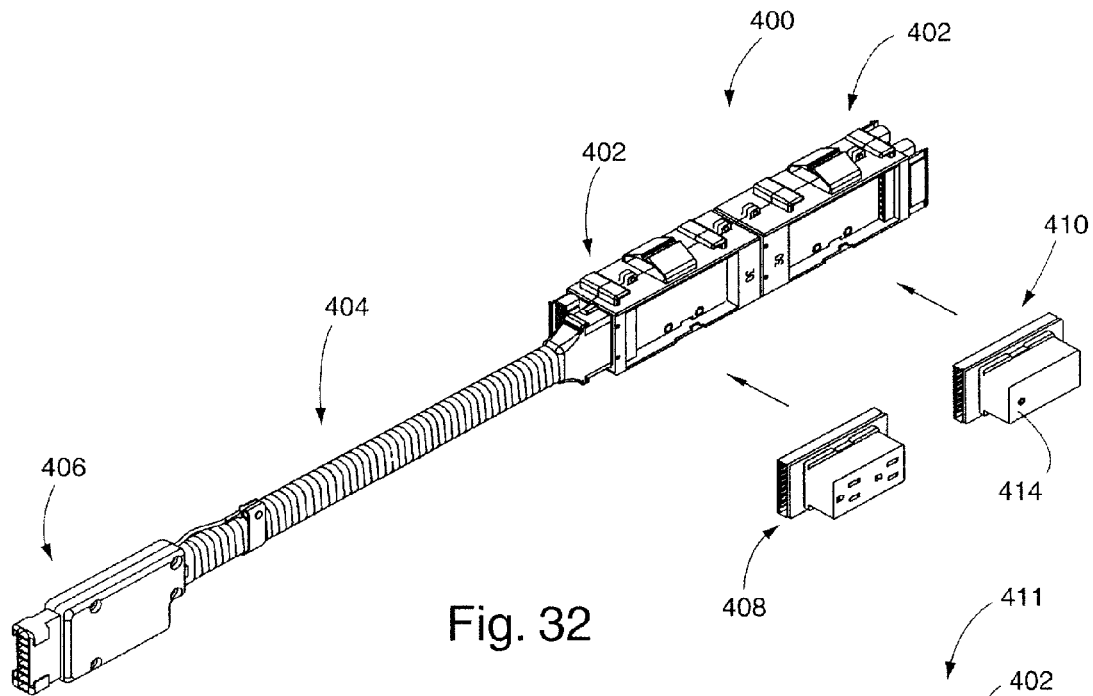
FIG. 32 is a perspective and exploded view of a raceway assembly, showing junction blocks adapted to engage a conventional electrical receptacle block and a DC receptacle block in accordance with the invention.
Figure 38:
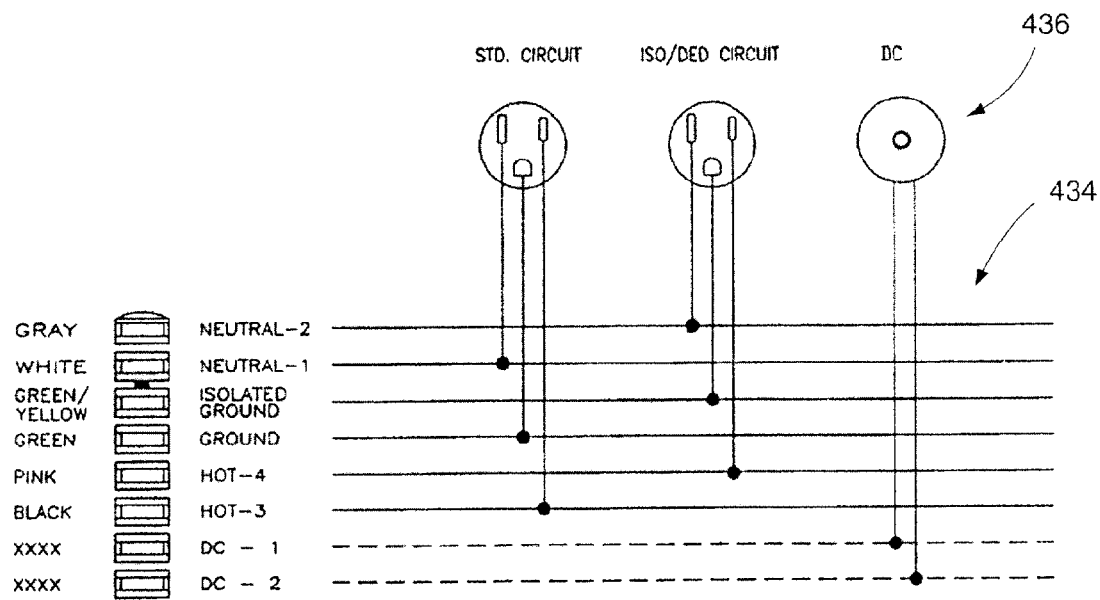
FIG. 38 is a schematic diagram (and partially block diagram) showing wiring or bus configurations for a junction block, and particularly showing DC buses or wires within the junction block and adapted to engage a DC receptacle block.

Turning to the drawings, FIG. 32 illustrates a raceway assembly 400, having a series of junction blocks 402. The junction blocks 402 are shown as being substantially interconnected together, and an end connector 406 is attached to one of the junction blocks 402 through a cable 404. One or both of the junction blocks 402 can have an internal electrical configuration substantially as shown in FIG. 38, with the integral configuration being characterized as configuration 434. As shown in FIG. 38, the electrical wires or buses of the junction block 434 include not only standard and isolated AC circuits, but also include wires (identified as "DC-1" and "DC-2") carrying DC power. Returning to FIG. 33, further shown therein is a conventional electrical receptacle 408. The electrical receptacle block 408 may be similar to electrical receptacle blocks previously described herein, and adapted to be electrically interconnected to the junction block 402. Also shown, and in accordance with the invention, is a DC receptacle block 410. The DC receptacle block 410, like the electrical receptacle block 408, is also adapted to be electrically interconnected to the junction block 402, in the same manner as is the electrical receptacle block 408, which was previously described herein. However, with reference to FIG. 38, the DC receptacle block 410 would have its terminal blades or terminal connectors configured so as to be interconnected to the DC buses or wires DC-1 and DC-2 as illustrated in FIG. 38. This is shown as DC connection 436. The DC receptacle block 410, with reference back to FIG. 32, can have a DC receptacle 414. The DC receptacle 414 can be a conventional DC receptacle, adapted to interconnect to plugs such as the DC plug 430 illustrated in FIG. 30.

Figure 33:
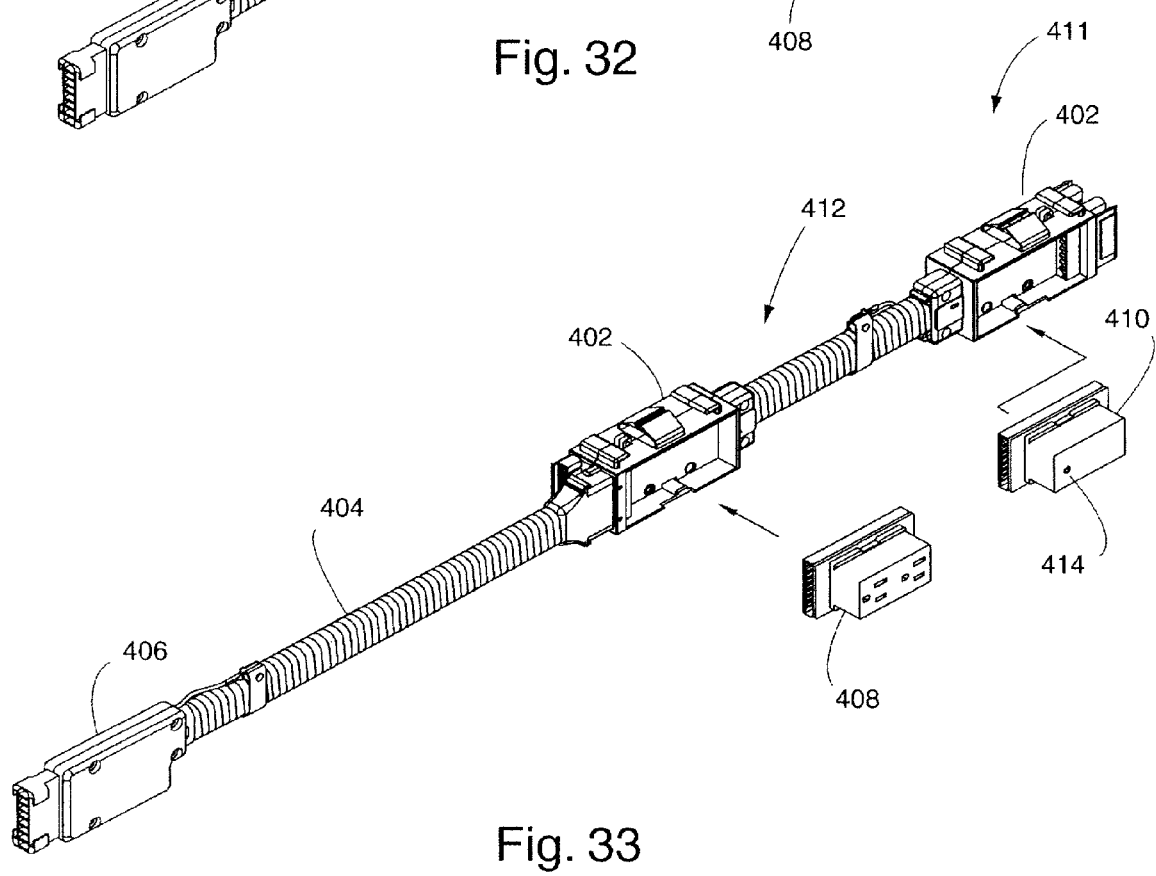
FIG. 33 is similar to FIG. 32, but shows a slightly different embodiment of the raceway assembly.
Figure 34:
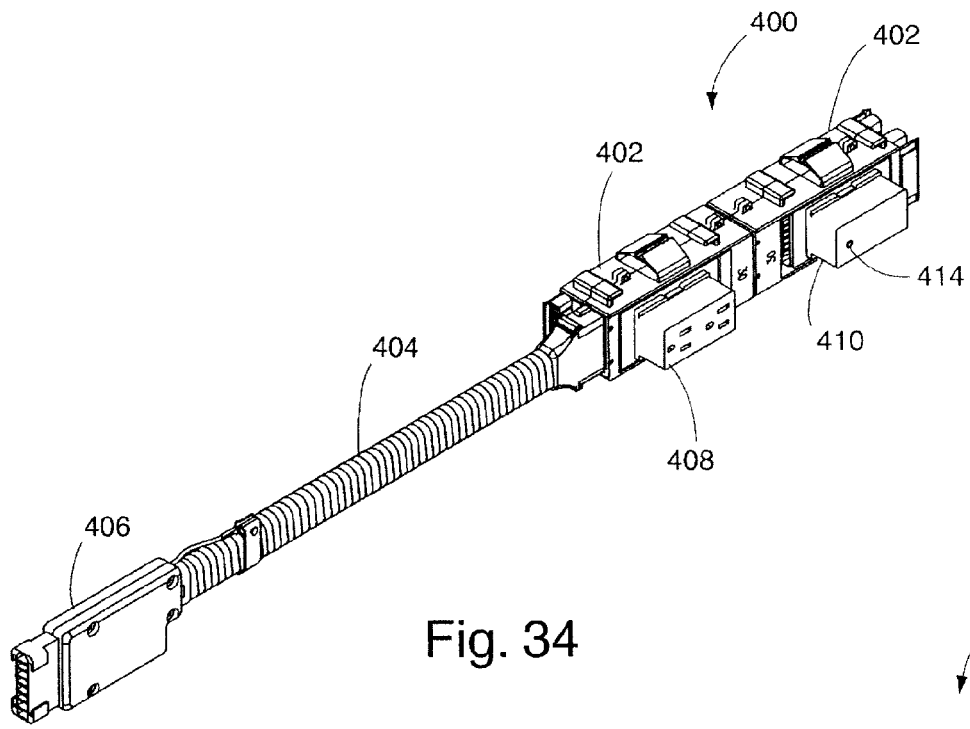
FIG. 34 is similar to FIG. 32, but shows the electrical receptacle block and DC receptacle block engaging the junction blocks.
Figure 35:
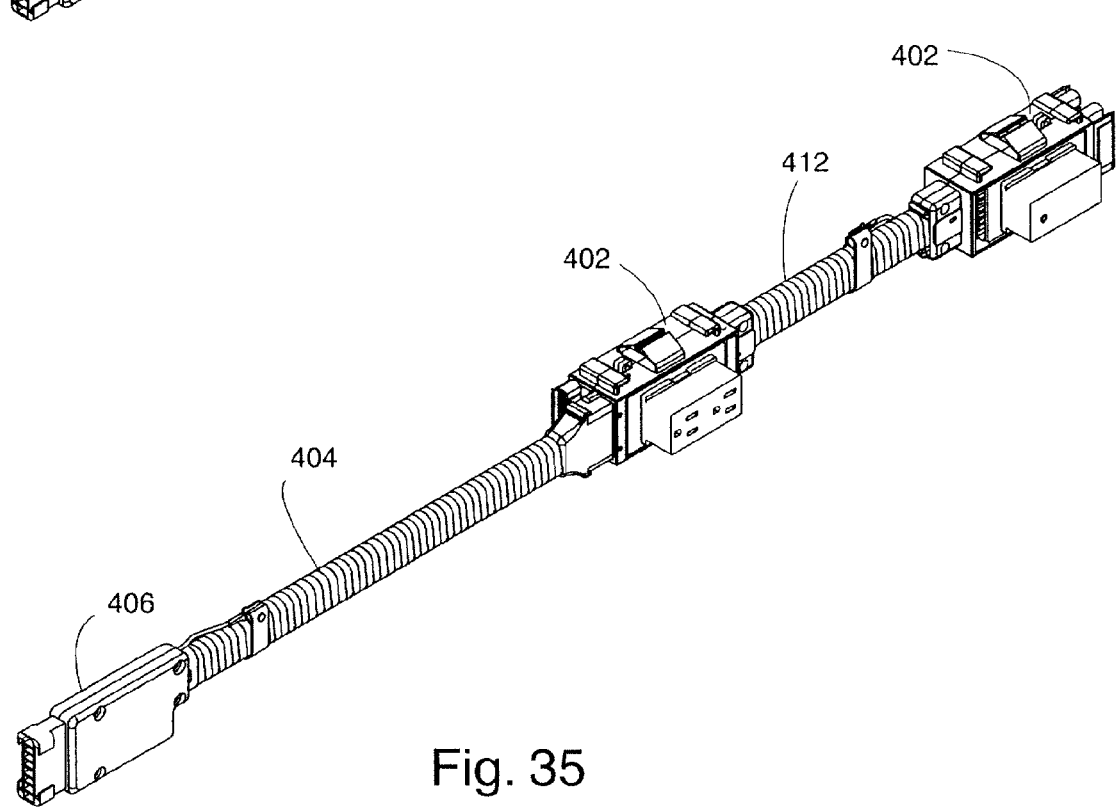
FIG. 35 is similar to FIG. 33, but shows the electrical receptacle block and DC receptacle block engaging the junction blocks.

FIG. 33 shows a raceway assembly 411 similar to raceway assembly 400, but with the junction blocks 402 separated by an intermediate cable 412. Otherwise, the raceway assembly 411, having the DC receptacle block 410 would operate in the same manner as the raceway assembly 400. FIG. 34 shows the raceway assembly 400 with the electrical receptacle 408 and DC receptacle block 410 electrically connected to the junction blocks 402. FIG. 34, similarly, shows an assembled version of the raceway assembly 411 shown in FIG. 33.

Figure 36:
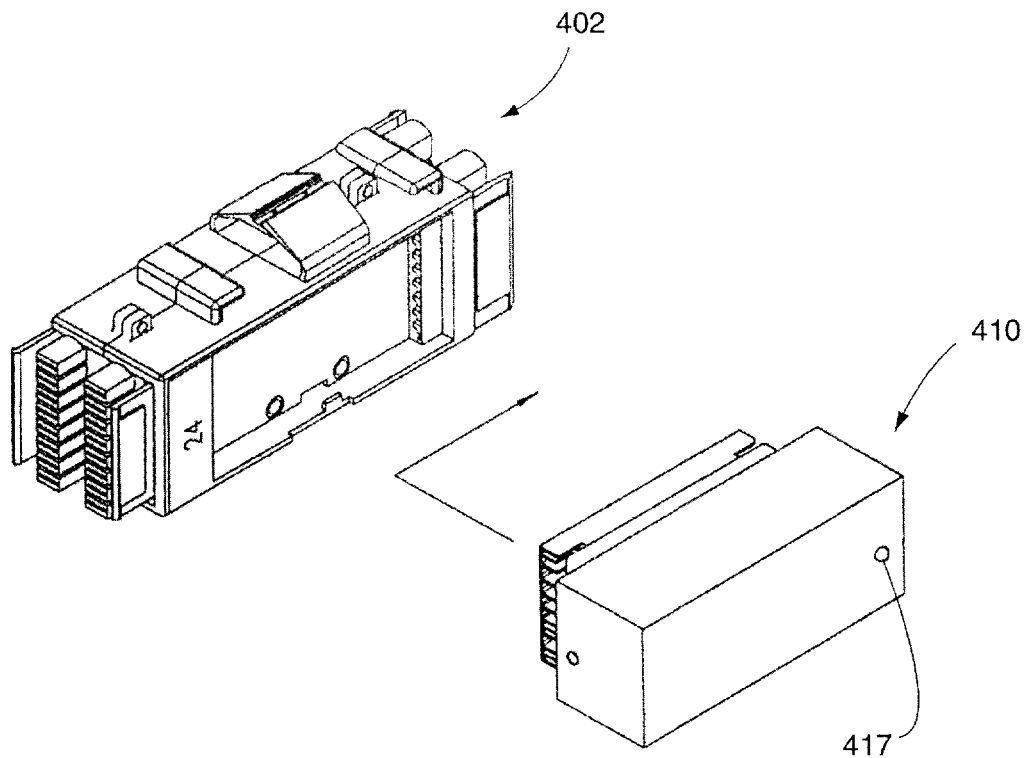
FIG. 36 is a further exploded view, showing more detail regarding the insertion of the DC receptacle block into the junction block.
Figure 37:
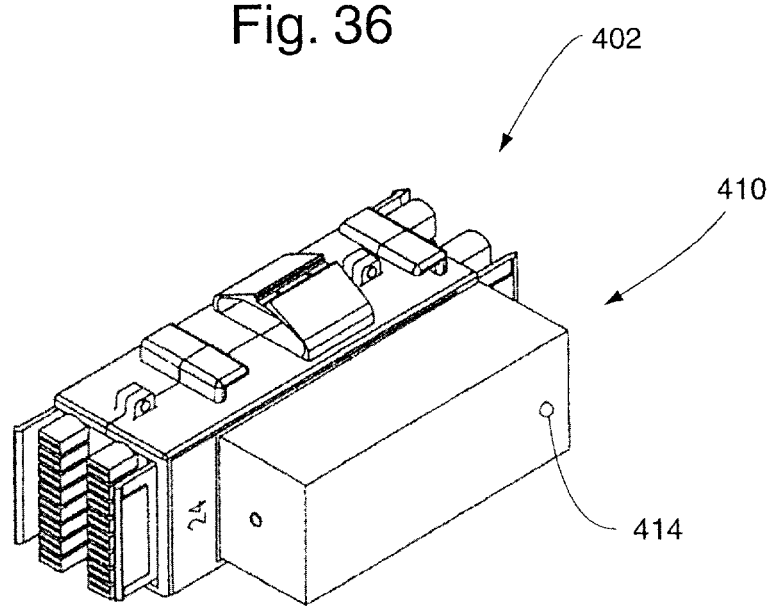
FIG. 37 is a perspective view of the junction block and DC receptacle block of FIG. 36 in an assembled state.
Figure 39:
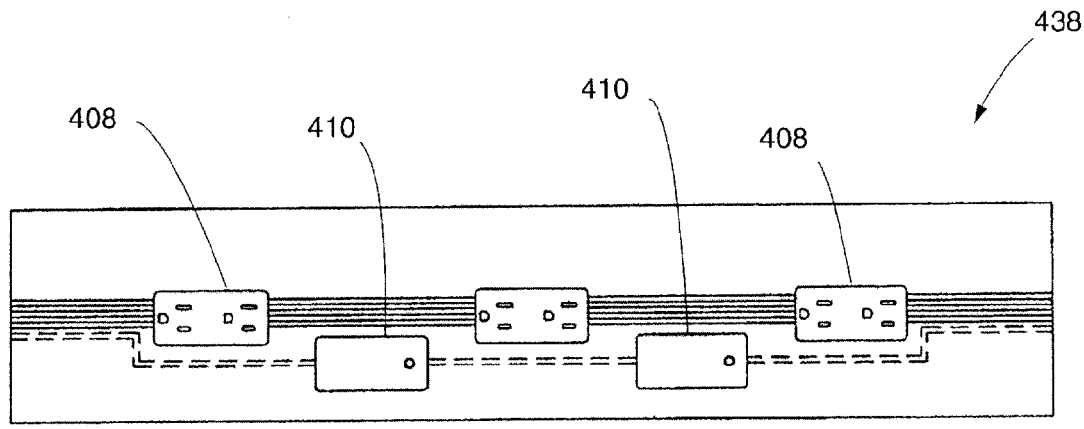
FIG. 39 is a partially block diagram and partially elevation view of a raceway assembly having both electrical receptacle blocks and DC receptacle blocks.

FIG. 36 is somewhat of an enlarged view, showing the particular manner in which the DC receptacle block 410 is electrically interconnected to the junction block 402. FIG. 37 is an assembled view of the components shown in FIG. 36. FIG. 39 shows a raceway assembly 438, in somewhat of a block diagram and somewhat of an elevation view. The raceway assembly 438 shows a series of electrical receptacle blocks 408, with DC receptacle blocks 410 also interconnected to the raceway assembly 438.

Figure 26:
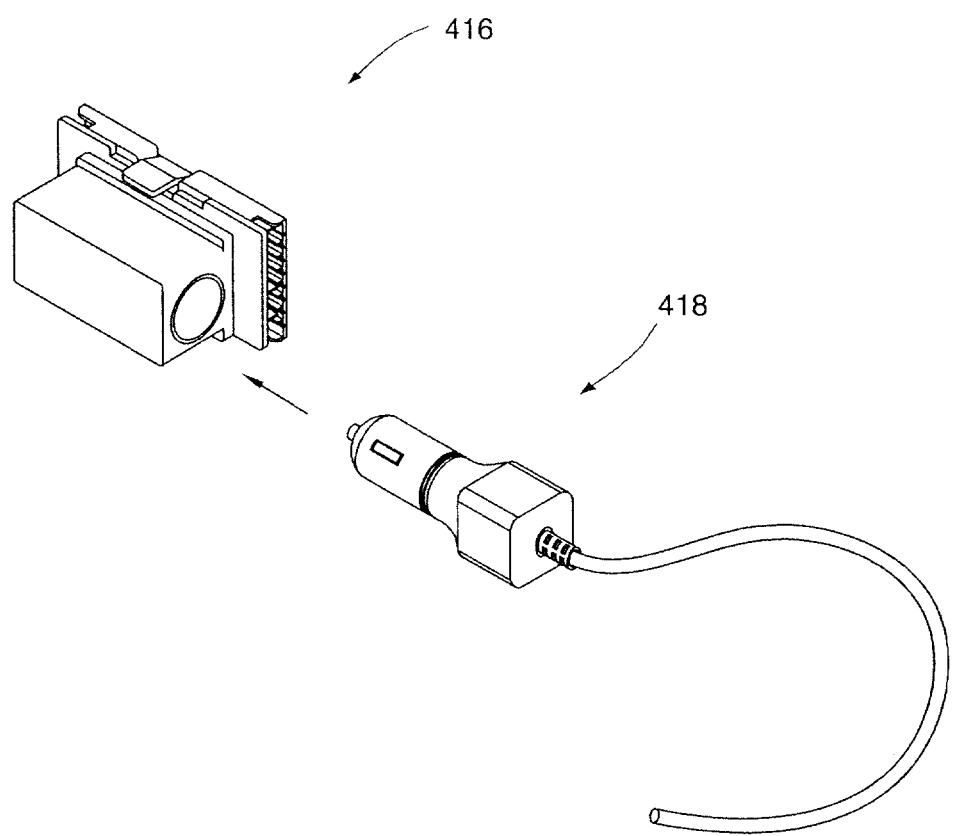
FIG. 26 is an exploded view showing a particular DC receptacle block configuration in accordance with the invention, adapted for use with a 12 volt plug.
Figure 27:
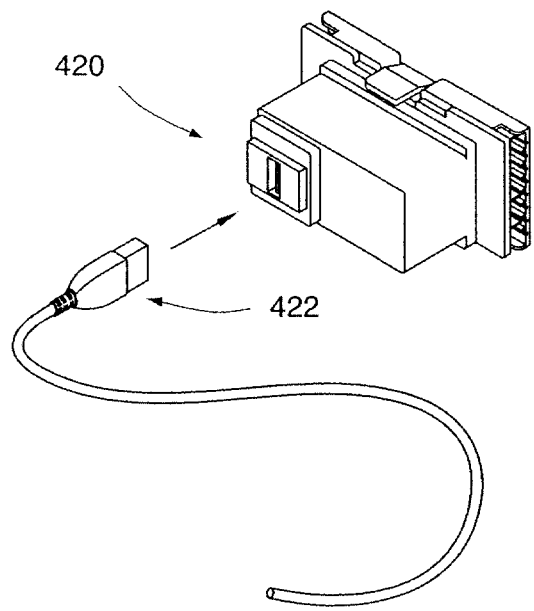
FIG. 27 is an exploded view showing what is characterized as a third receptacle block configuration, with a third type of receptacle block and a third type of receptacle plug adapted for engagement therewith.
Figure 28:
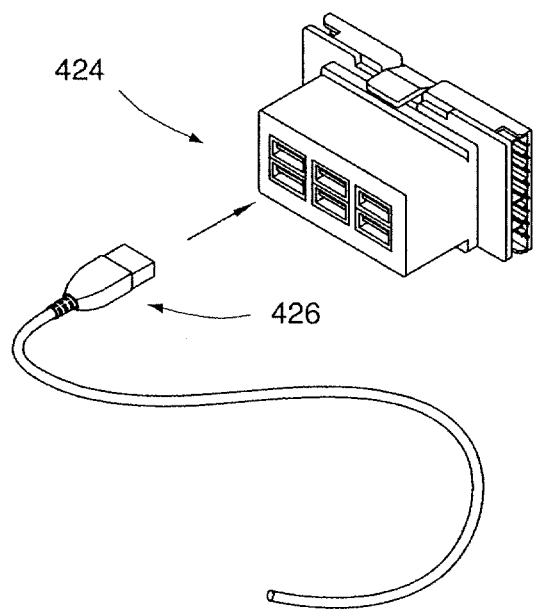
FIG. 28 is an exploded view showing a fourth type of receptacle block, showing the use of a DC receptacle array, and a fourth DC plug having a particular configuration and adapted to be engaged with any one of the receptacles of the receptacle array.

One aspect of the DC receptacle blocks in accordance with the invention is that they can be utilized with various types of DC receptacles and DC plugs. For example, FIG. 26 illustrates a DC receptacle 416 which would typically be characterized as a 12 volt receptacle. FIG. 26 also shows the capability of electrically engaging a 12 volt plug 418 into the DC receptacle block 416. Such a plug is used, for example, in automobiles with cell phones and other apparatus which may be capable of running directly off of the automobile's DC battery. FIG. 27 illustrates a further embodiment of a receptacle configuration 420. This particular receptacle configuration is well known with respect to DC circuitry, and utilizes a standard DC plug as illustrated in FIG. 27 as receptacle block 422. A somewhat similar type of DC receptacle configuration is illustrated in FIG. 28, and utilizes an array of DC receptacles 424. For this configuration, a further DC receptacle plug 426 may be utilized to selectively engage any one DC receptacle within the array 424.

Figure 29:
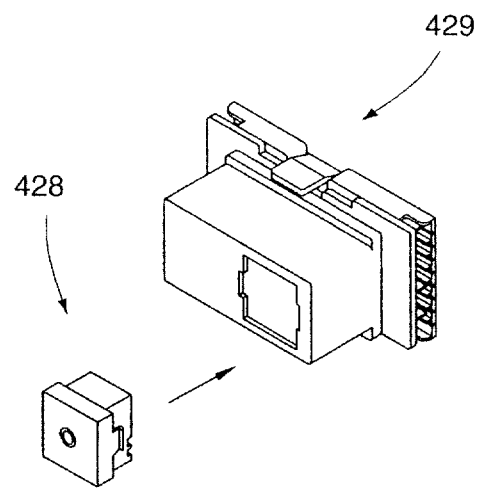
FIG. 29 is an exploded view of a fourth embodiment of a DC receptacle block in accordance with the invention, showing a particular insert which may be selectively engaged with the DC receptacle block.
Figure 30:
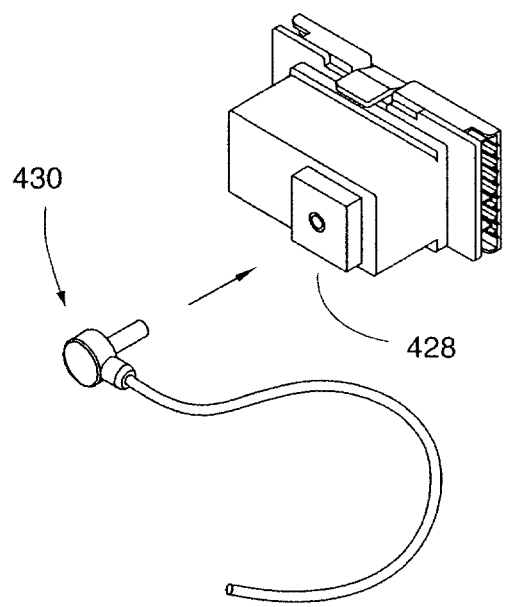
FIG. 30 shows the assembly of the DC receptacle block and DC receptacle insert shown in FIG. 29, and further shows a DC plug adapted to be selectively engaged into the DC receptacle formed by the DC receptacle insert.
Figure 31:
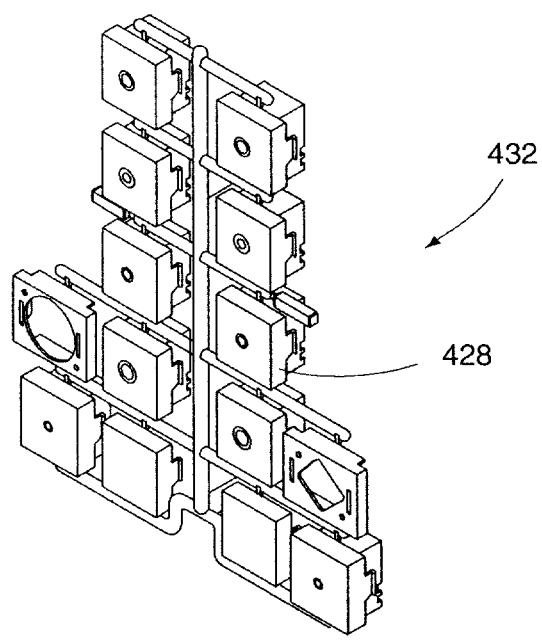
FIG. 31 is a perspective view of a tree of receptacle inserts which may be provided as a kit, for purposes of providing a user of the DC receptacle blocks in accordance with the invention with various size and shapes of receptacles.

FIG. 29 illustrates a further configuration of a DC receptacle block in accordance with the invention, showing an embodiment of a DC receptacle block 429 with a selectively engagable DC receptacle 428. The DC receptacle insert 428 may be any one of a series of inserts formed on a tree kit such as the tree kit 432 illustrated in FIG. 31. In this manner, if the user requires the kit 432, the user can select any one of the DC receptacle inserts associated with the kit. The receptacle inserts associated with the kit 432 may be of various sizes and configurations. FIG. 30 illustrates a particular DC receptacle plug 430 which may be utilized with the DC receptacle insert 428 when inserted into the DC receptacle block 429.

It will be apparent to those skilled in the pertinent arts that other embodiments of in accordance with the invention can be designed. That is, the principles of the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

What is claimed is:

1. A junction block and raceway assembly for use in a raceway, said junction block and raceway assembly comprising:
    a junction block having opposite end portions and defining a cavity in a side of said junction block between said opposite end portions, said junction block further having a first set of electrical connector terminals at one of said opposite end portions, and a second set of electrical connector terminals disposed at said cavity;
    a plurality of electrical conductors disposed in said junction block, said electrical conductors including at least two DC conductors in electrical communication with respective ones of said electrical connector terminals of said first and second sets thereof;
    a DC receptacle insert having a receptacle portion configured to receive a DC plug;
    a DC receptacle block comprising a plurality of electrical conductors configured for electrical engagement with said second set of electrical connector terminals when said DC receptacle block is positioned at said cavity of said junction block, to thereby electrically connect said DC receptacle block to said DC conductors in said junction block, wherein said DC receptacle block defines an opening configured to receive said DC receptacle insert;
    a cable having at least two AC conductors, at least two DC conductors, and an end connector that is in electrical communication with at least said DC conductors of said cable, wherein said end connector is configured to couple to one of said first and second sets of electrical connector terminals of said junction block; and
    wherein when said DC receptacle insert is received in said DC receptacle block, said receptacle portion of said DC receptacle insert is electrically coupled to said DC conductors of said junction block via said DC receptacle block.

2. The junction block and raceway assembly of claim 1, wherein said DC receptacle insert is removable and replaceable at said DC receptacle block.

3. The junction block and raceway assembly of claim 2, wherein said opening in said DC receptacle block is configured to receive a plurality of different ones of said DC receptacle inserts, and wherein said receptacle portions of said different ones of said DC receptacle inserts each comprise one of at least three different sizes or configurations of DC receptacle.

4. The junction block and raceway assembly of claim 3, wherein said receptacle portion of at least one of said DC receptacle inserts comprises a circular low voltage DC receptacle, and said receptacle portion of at least one other of said DC receptacle inserts comprises a rectangular low voltage DC receptacle.

5. A junction block and raceway assembly for use in a raceway, said junction block and raceway assembly comprising:
   a junction block having opposite end portions, first and second sets of electrical connector terminals at said opposite end portions, and a third set of electrical connector terminals between said first and second sets of electrical terminals;
   a plurality of electrical conductors including at least two DC conductors configured to carry DC power, said at least two DC conductors being disposed in said junction block and in electrical communication with respective ones of said electrical connector terminals of said first, second, and third sets thereof;
   a DC receptacle insert having a receptacle portion configured to receive a DC plug;
   a DC receptacle block comprising a plurality of electrical conductors configured for electrical engagement with said third set of electrical connector terminals when said DC receptacle block is coupled to said junction block, to thereby electrically connect said DC receptacle block to said DC conductors, wherein said DC receptacle block defines an opening configured to receive said DC receptacle insert;
   a cable having at least two AC conductors, at least two DC conductors, and an end connector that is in electrical communication with at least said DC conductors of said cable, wherein said end connector is configured to couple to one of said first and second sets of electrical connector terminals of said junction block; and
   wherein when said DC receptacle insert is received in said DC receptacle block, said receptacle portion of said DC receptacle insert is electrically coupled to said DC conductors of said junction block via said DC receptacle block.

6. The junction block and raceway assembly of claim 5, further comprising:
   an AC receptacle block configured for electrical engagement with said AC conductors of said cable;
   an AC receptacle at said AC receptacle block, wherein said AC receptacle is configured for releasable engagement by an AC connector; and
   wherein when said AC receptacle block is electrically engaged with said AC junction block, said AC receptacle is electrically energizable by said AC conductors of said cable.

7. The junction block and raceway assembly of claim 5, wherein said DC receptacle insert is removable and replaceable at said DC receptacle block.

8. The junction block and raceway assembly of claim 7, wherein said opening in said DC receptacle block is configured to receive a plurality of different ones of said DC receptacle inserts, and wherein said receptacle portions of said different ones of said DC receptacle inserts each comprise one of at least three different sizes or configurations of DC receptacle.

9. The junction block and raceway assembly of claim 8, wherein said receptacle portion of at least one of said DC receptacle inserts comprises an automotive-type 12V DC receptacle, and said receptacle portion of at least one other of said DC receptacle inserts comprises a generally rectangular low voltage DC receptacle.

10. The junction block and raceway assembly of claim 8, further in combination with a kit containing said different ones of said DC receptacle inserts.

11. The junction block and raceway assembly of claim 10, wherein said kit comprises a tree kit in which said different ones of said DC receptacle inserts are coupled together.

12. A junction block and raceway assembly for use in a raceway, said junction block assembly comprising:
   a junction block having opposite end portions, first and second sets of electrical connector terminals at said opposite end portions, and a third set of electrical connector terminals between said first and second sets of electrical terminals;
   a plurality of electrical conductors including at least two DC conductors configured to carry DC power, said at least two DC conductors being disposed in said junction block and in electrical communication with respective ones of said electrical connector terminals of said first, second, and third sets thereof;
   a DC receptacle block comprising a plurality of electrical conductors configured for electrical engagement with said third set of electrical connector terminals, to thereby electrically connect said DC receptacle block to said DC conductors;
   a receptacle portion disposed at said DC receptacle block and configured to receive a DC plug, wherein either (i) said receptacle portion comprises three or more receptacles arranged in an array, or (ii) said receptacle portion comprises a DC receptacle insert configured for removable insertion into an opening formed in said DC receptacle block;
   a cable having at least two AC conductors, at least two DC conductors, and an end connector that is in electrical communication with at least said DC conductors of said cable, wherein said end connector is configured to couple to one of said first and second sets of electrical connector terminals of said junction block; and
   wherein when said receptacle portion is received in said DC receptacle block, said receptacle portion is electrically coupled to said DC conductors of said junction block.

13. The junction block and raceway assembly of claim 12, wherein:
   said receptacle portion comprises said DC receptacle insert and said DC receptacle block comprises said opening;
   said opening in said DC receptacle block is configured to receive a plurality of different ones of said DC receptacle inserts; and
   said receptacle portions of said different ones of said DC receptacle inserts each comprise one of at least three different sizes or configurations of DC receptacle.

14. The junction block and raceway assembly of claim 13, wherein said receptacle portion of at least one of said DC receptacle inserts comprises an automotive-type 12V DC receptacle, and said receptacle portion of at least one other of said DC receptacle inserts comprises a generally rectangular low voltage DC receptacle.

15. The junction block and raceway assembly of claim 13, further in combination with a kit containing said plurality of different ones of said DC receptacle inserts.

16. The junction block and raceway assembly of claim 15, wherein said kit comprises a tree kit in which said plurality of different ones of said DC receptacle inserts are coupled together.

17. A junction block assembly for use in a raceway, said junction block assembly comprising:
- a junction block having opposite end portions, first and second sets of electrical connector terminals at said opposite end portions, and a third set of electrical connector terminals between said first and second sets of electrical terminals;
- a plurality of electrical conductors including at least two DC conductors configured to carry DC power, said at least two DC conductors being disposed in said junction block and in electrical communication with respective ones of said electrical connector terminals of said first, second, and third sets thereof;
- a plurality of different DC receptacle inserts arranged in a kit, each of said DC receptacle inserts having a respective receptacle portion configured to receive a DC plug;
- a DC receptacle block comprising a plurality of electrical conductors configured for electrical engagement with said third set of electrical connector terminals when said DC receptacle block is coupled to said junction block, to thereby electrically connect said DC receptacle block to said DC conductors, wherein said DC receptacle block defines an opening configured to receive said DC receptacle insert;
- wherein said opening in said DC receptacle block is configured to receive at least one of said DC receptacle inserts, and wherein said receptacle portions of said DC receptacle inserts each comprise one of at least three different sizes or configurations of DC receptacle; and
- wherein when said DC receptacle insert is received in said DC receptacle block, said receptacle portion of said DC receptacle insert is electrically coupled to said DC conductors via said DC receptacle block.

18. The junction block assembly of claim 17, wherein said kit comprises a tree kit in which said different ones of said DC receptacle inserts are coupled together.

19. The junction block assembly of claim 17, wherein said receptacle portion of at least one of said DC receptacle inserts comprises an automotive-type 12V DC receptacle, and said receptacle portion of at least one other of said DC receptacle inserts comprises a generally rectangular low voltage DC receptacle.

20. The junction block assembly of claim 17, wherein said DC receptacle inserts are removable and replaceable at said DC receptacle block.

* * * * *